(12) United States Patent
Zhang et al.

(10) Patent No.: US 12,301,344 B2
(45) Date of Patent: May 13, 2025

(54) CONTINUOUS PHASE MODULATION IN WIRELESS COMMUNICATIONS

(71) Applicant: QUALCOMM Incorporated, San Diego, CA (US)

(72) Inventors: Xiaoxia Zhang, San Diego, CA (US); Bin Tian, San Diego, CA (US); Jing Sun, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 17/804,479

(22) Filed: May 27, 2022

(65) Prior Publication Data

US 2023/0388044 A1 Nov. 30, 2023

(51) Int. Cl.
*H04W 4/00* (2018.01)
*H04L 1/00* (2006.01)
(Continued)

(52) U.S. Cl.
CPC ...... *H04L 1/0003* (2013.01); *H04L 25/03159* (2013.01); *H04L 27/2605* (2013.01); *H04L 27/36* (2013.01)

(58) Field of Classification Search
CPC ............... H04L 1/0003; H04L 27/2605; H04L 25/03159; H04L 27/36; H04L 1/00; H04L 25/03; H04L 27/26
(Continued)

(56) References Cited

U.S. PATENT DOCUMENTS 11,678,285 B2 * 6/2023 Soltani .............. H04W 56/0035
370/503
11,716,711 B2 * 8/2023 Zhang ............... H04W 72/0446
370/336
(Continued)

FOREIGN PATENT DOCUMENTS

EP           3522471 A1    8/2019
WO        2020160554 A1    8/2020

OTHER PUBLICATIONS

International Search Report and Written Opinion—PCT/US2023/023019—ISA/EPO—Sep. 8, 2023.
(Continued)

*Primary Examiner* — Marceau Milord
(74) *Attorney, Agent, or Firm* — Paul M. McAdams; Procopio, Cory, Hargreaves & Savitch LLP

(57) ABSTRACT

Aspects presented herein may improve communications at high bandwidth or coverage limited scenarios, which may specify high transceiver energy efficiency and robustness to non-linear power amplifiers. In one aspect, a first network node transmits first information indicative of at least one of a modulation scheme or a modulation parameter to a second network node, where the modulation scheme is from a set of modulation schemes and the modulation parameter is associated with the modulation scheme, and where the set of modulation schemes includes one or more of: APSK, QAM, CPM, ceCPM, or MACPM. The first network node, from the second network node, second information indicative of at least one of the modulation scheme or the modulation parameter associated with the modulation scheme for at least one transmission.

34 Claims, 14 Drawing Sheets

(51) Int. Cl.
*H04L 25/03* (2006.01)
*H04L 27/26* (2006.01)
*H04L 27/36* (2006.01)

(58) Field of Classification Search
USPC .......................................................... 370/329
See application file for complete search history.

(56) References Cited

U.S. PATENT DOCUMENTS

| | | | | |
|---|---|---|---|---|
| 11,770,282 | B2* | 9/2023 | Xin | H04L 27/262 |
| | | | | 375/262 |
| 11,849,447 | B2* | 12/2023 | Li | H04L 27/0006 |
| 11,930,527 | B2* | 3/2024 | Elshafie | H04W 74/006 |
| 11,996,965 | B2* | 5/2024 | Ma | H04L 25/03828 |
| 12,010,049 | B2* | 6/2024 | Sakhnini | H04J 11/0076 |
| 12,069,733 | B2* | 8/2024 | Ye | H04L 5/0053 |
| 2006/0165008 | A1* | 7/2006 | Li | H04L 1/0034 |
| | | | | 370/252 |
| 2010/0034152 | A1* | 2/2010 | Imamura | H04L 27/0012 |
| | | | | 370/329 |
| 2018/0048513 | A1 | 2/2018 | Al-Imari et al. | |
| 2018/0294916 | A1* | 10/2018 | Akkarakaran | H04L 5/0092 |
| 2019/0261315 | A1* | 8/2019 | Zhang | H04L 1/0001 |
| 2020/0328843 | A1* | 10/2020 | Lomayev | H04L 5/0023 |
| 2020/0337015 | A1* | 10/2020 | Chuang | H04W 72/0446 |
| 2020/0351070 | A1* | 11/2020 | Chou | H04L 27/262 |
| 2021/0013990 | A1* | 1/2021 | Chen | H04L 1/16 |
| 2021/0281455 | A1* | 9/2021 | Lee | H04L 27/0008 |
| 2021/0288747 | A1* | 9/2021 | Yu | H04L 1/0003 |
| 2021/0320825 | A1* | 10/2021 | Banuli Nanje Gowda | |
| | | | | H04L 25/03968 |
| 2022/0015150 | A1* | 1/2022 | Ye | H04W 72/542 |
| 2022/0200746 | A1* | 6/2022 | Sakhnini | H04L 5/0037 |
| 2022/0271983 | A1* | 8/2022 | Ma | H04L 27/2636 |
| 2023/0141830 | A1* | 5/2023 | Zhang | H04W 72/23 |
| | | | | 370/329 |
| 2023/0163902 | A1* | 5/2023 | Saggar | H04L 5/0007 |
| | | | | 370/329 |
| 2023/0216604 | A1* | 7/2023 | Yu | H04L 5/0091 |
| | | | | 370/329 |
| 2023/0254061 | A1* | 8/2023 | Ruan | H04L 1/0029 |
| | | | | 370/329 |

OTHER PUBLICATIONS

Mathiopoulos P.T., et al., "Performance Improvement Techniques for the DVB-RCS2 Return Link Air Interface", International Journal of Satellite Communications and Networking, vol. 33, No. 5, Aug. 6, 2015, pp. 371-390, XP055872911, sections 1 and 4.

Zaidi A.A., et al., "A Preliminary Study on Waveform Candidates for 5G Mobile Radio Communications above 6 GHz", 2016 IEEE 83rd Vehicular Technology Conference (VTC Spring), May 15, 2016, 6 pages, XP032920015, p. 3.

* cited by examiner

| Constraint | | Actual | | | $\omega_{opt}$ |
|---|---|---|---|---|---|
| $A_{max}$ | $A_{min}$ | $A_{max}$ | $A_{min}$ | $d^2_{min}$ | |
| 1 | 1 | 1 | 1 | 0.422 | --- |
| --- | --- | 1.090 | 0.883 | 0.413 | [1, 1, 1, 1, 1, 1] |
| 1.1 | 0.9 | 1.100 | 0.906 | 0.494 | [1, .437, .627, .997, 1.02, .614, .427] |
| 1.2 | 0.8 | 1.178 | 0.800 | 0.542 | [1, .030, .917, .803, .797, .922, .033] |
| 1.3 | 0.7 | 1.264 | 0.700 | 0.593 | [1, .262, 2.10, .211, 1.06, 1.62, .000] |
| 1.4 | 0.6 | 1.315 | 0.600 | 0.689 | [1, .016, 2.54, .557, .257, 2.42, .000] |
| 1.5 | 0.5 | 1.331 | 0.522 | 0.802 | [1, .029, 3.38, .101, .000, 3.08, .000] |
| --- | --- | 1.285 | 0.184 | 0.879 | [1, 0, 0, 0, 0, 0, 0] |

Example of an envelope variation of ceCPM

CONTINUOUS PHASE MODULATION IN WIRELESS COMMUNICATIONS

TECHNICAL FIELD

The present disclosure relates generally to communication systems, and more particularly, to wireless communication involving continuous phase modulation (CPM).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits first information indicative of at least one of a modulation scheme or a modulation parameter to a second network node, where the modulation scheme is from a set of modulation schemes and the modulation parameter is associated with the modulation scheme, and where the set of modulation schemes includes one or more of: amplitude and phase-shift keying (APSK), quadrature amplitude modulation (QAM), continuous phase modulation (CPM), constrained envelope CPM (ceCPM), or multi-amplitude CPM (MACPM). The apparatus receives, from the second network node, second information indicative of at least one of the modulation scheme or the modulation parameter associated with the modulation scheme for at least one transmission.

In another aspect of the disclosure, a method, a computer-readable medium, and an apparatus are provided. The apparatus receives first information indicative of at least one of a modulation scheme or a modulation parameter from a second network node, where the modulation scheme is from a set of modulation schemes and the modulation parameter is associated with the modulation scheme, and where the set of modulation schemes includes one or more of: APSK, QAM, CPM, ceCPM, or MACPM. The apparatus transmits, to the second network node, second information indicative of at least one of the modulation scheme or the modulation parameter associated with the modulation scheme for at least one transmission.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
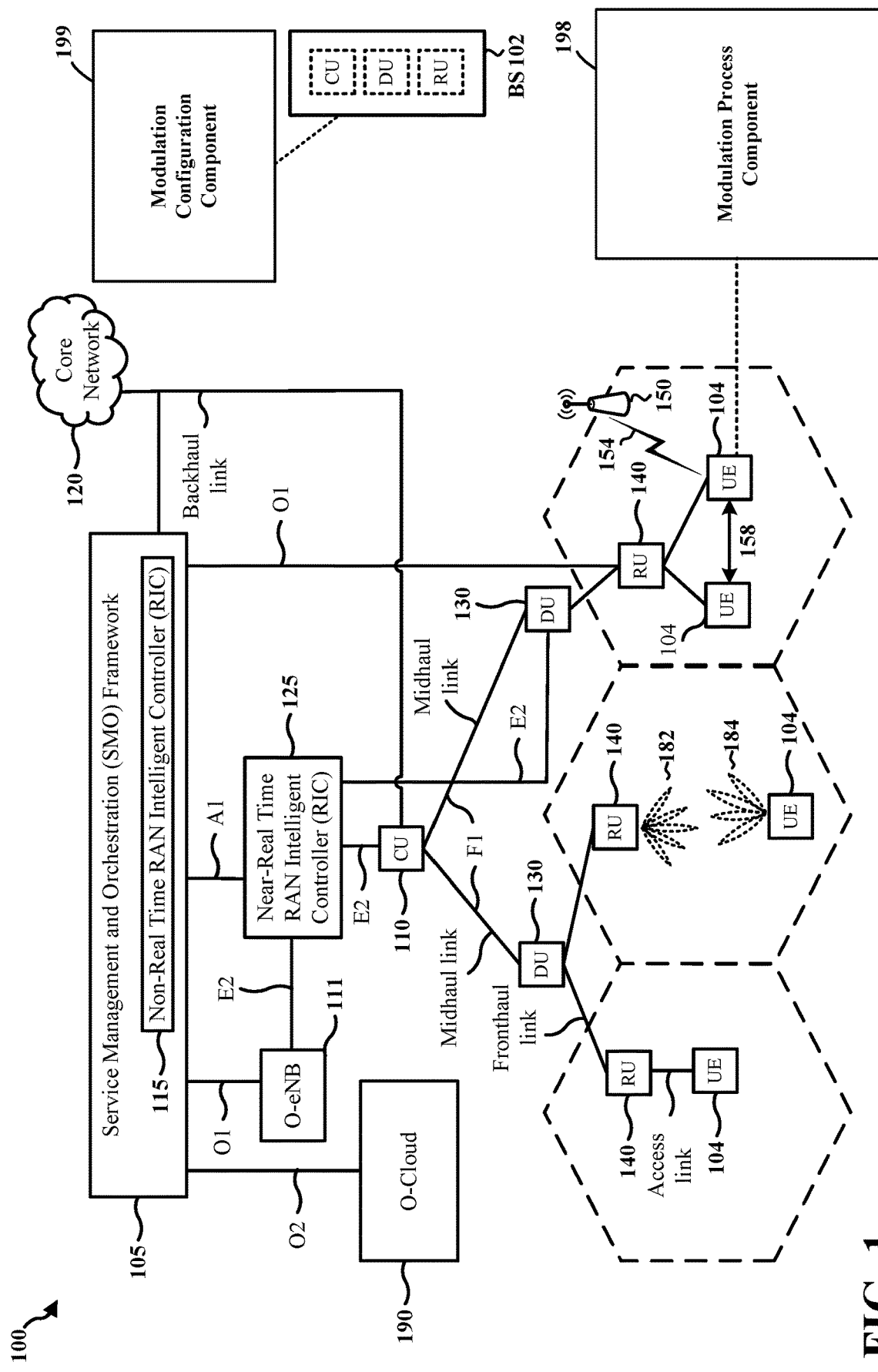
FIG. 1 is a diagram illustrating an example of a wireless communications system and an access network.

Aspects presented herein may improve communications at high bandwidth and/or coverage limited millimeter wave (mmW) scenarios, which may specify high transceiver energy efficiency and high robustness to non-linear power amplifiers. Aspects presented herein may enable more types of waveforms to be configured between wireless devices, such that communication between wireless devices may be more flexible and can be dynamically changed based on communication conditions. For example, in one aspect of the present disclosure, a UE may indicate one or more modulation schemes to a base station (or component(s) of the base station), and the base station may configure a modulation scheme and/or modulation parameter(s) for the UE based on the UE's indication or further based on additional condition(s). In another example, modulation based on ceCPM and/or MACPM may be provided to a transmitting device to achieve better user multiplexing, as well as an improved implementation with frequency selective channels.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a modulation process component 198 configured to indicate one or more modulation schemes to the base station 102 (or component(s) of the base station 102) and receive a modulation scheme/parameter configuration from the base station 102 based on the indication. In one configuration, the modulation process component 198 may transmit first information indicative of at least one of a modulation scheme or a modulation parameter to a second network node, where the modulation scheme is from a set of modulation schemes and the modulation parameter is associated with the modulation scheme, and where the set of modulation schemes includes one or more of: APSK, QAM, CPM, ceCPM, or MACPM. In such configuration, the modulation process component 198 may receive, from the second network node, second information indicative of at least one of the modulation scheme or the modulation parameter associated with the modulation scheme for at least one transmission.

In certain aspects, the base station 102 may include a modulation configuration component 199 configured to receive information from the UE 104 indicative of one or more favored/suitable modulation schemes, and in response, the base station 102 may configure a modulation scheme and/or related modulation parameters based on the information. In one configuration, the modulation configuration component 199 may receive first information indicative of at least one of a modulation scheme or a modulation parameter from a second network node, where the modulation scheme is from a set of modulation schemes and the modulation parameter is associated with the modulation scheme, and where the set of modulation schemes includes one or more of: APSK, QAM, CPM, ceCPM, or MACPM. In such configuration, the modulation configuration component 199 may transmit, to the second network node, second information indicative of at least one of the modulation scheme or the modulation parameter associated with the modulation scheme for at least one transmission.

Figure 2:
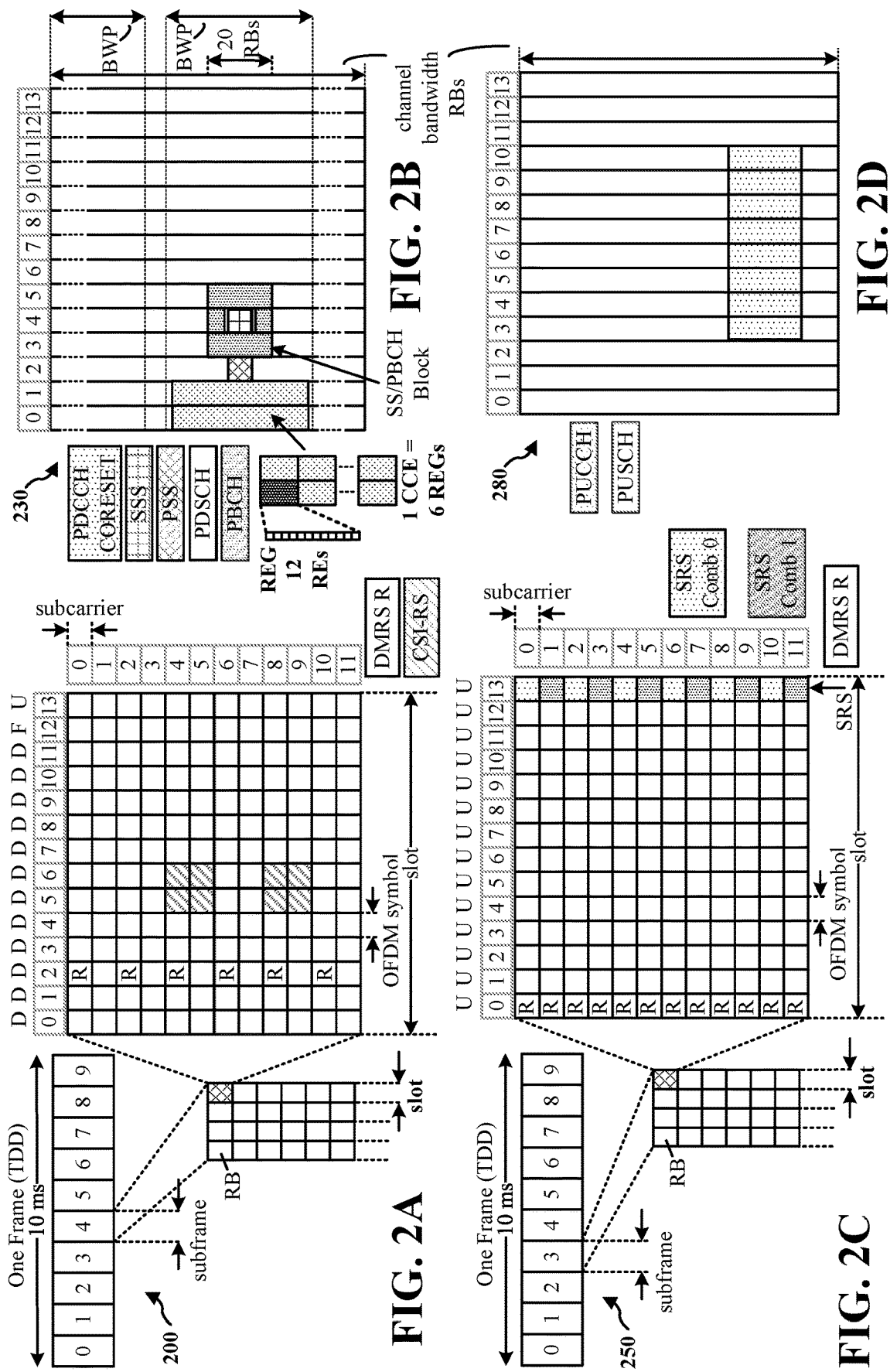
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
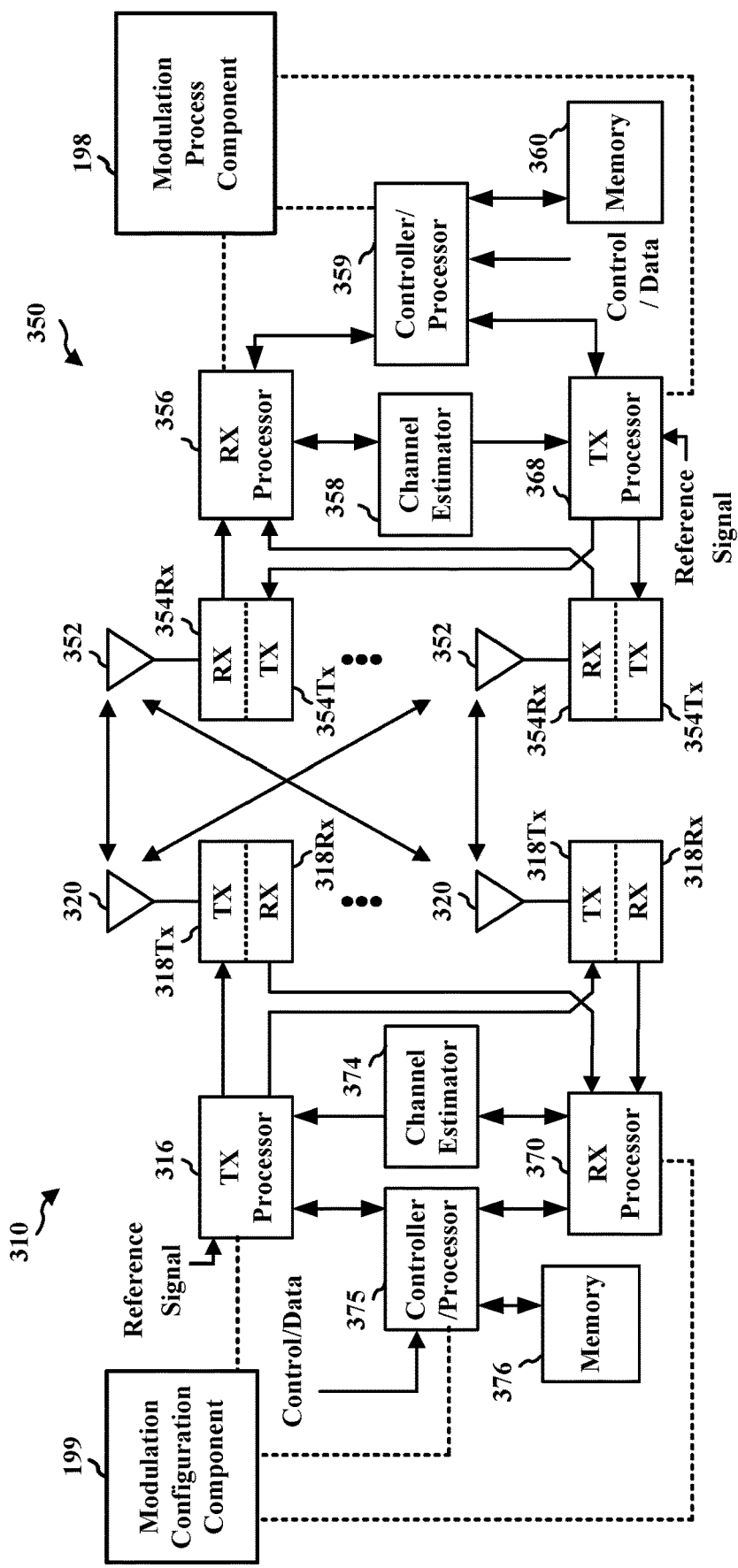
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the modulation process component 198 of FIG. 1.

At least one of the TX processor 316, the RX processor 370, and the controller/processor 375 may be configured to perform aspects in connection with the modulation configuration component 199 of FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some networks, such as the 4G Long Term Evolution (LTE) and the 5G New Radio (NR), discrete Fourier transform (DFT) preceding is commonly used to provide both low peak-to-average-power ratio (PAPR) and user multiplexing in frequency domain (e.g., single-carrier frequency-division multiple access (SC-FDMA)). For example, $\pi/2$ binary phase shift keying (BPSK), quadrature phase shift keying (QPSK), quadrature amplitude modulation (QAM) constellation modulation symbols may be used for (e.g., passed through) the DFT-precoder. Phase-shift keying (PSK) may refer to a digital modulation process which conveys data by changing (e.g., modulating) the phase of a constant frequency reference signal (e.g., a carrier wave). The modulation may be accomplished by changing the sine and cosine inputs at a precise time. The number of changes may be random and equal to the power of 2. For example, BPSK is a coherent modulation technique that specifies synchronization between the transmitter and the receiver using two phase values: −180° and +180°, encoded as a single bit in the binary code as a logical 0 or 1, and QPSK is a technique that uses four phase-shift values −45°, −135°, +45° or +135° (e.g., shift every 90°), expressed as two bits in the binary code: 00, 01, 11, or 10. In some examples, for a communication system/device with a nonlinear distortion (e.g., the output of a power amplifier (PA) used in association with the system/device is not proportional to the input), amplitude and phase-shift keying (APSK), a digital modulation scheme that conveys data by modulating both the amplitude and the phase of a carrier wave, may be a good modulation choice as it is capable of reducing the PAPR and obtaining a sustained system performance.

In some implementations, continuous phase modulation (CPM) may also be used to further reduce the PAPR and non-linearity where the modulation symbols are carried in the phase of CPM signaling. In contrast to other coherent digital phase modulation techniques where the carrier phase may be reset to zero at the start of every symbol, CPM is a modulation technique where the carrier phase is modulated in a continuous manner. For instance, with QPSK, a carrier may instantaneously change from a sine to a cosine (e.g., for a 90 degree phase shift) if one of the two message bits of a current symbol differs from the two message bits of a previous symbol. In some examples, the discontinuity in carrier phase may specify a relatively large percentage of the power to occur outside of a configured band (e.g., high fractional out-of-band power), leading to a lower spectral efficiency. As CPM may be implemented as a constant-envelope waveform (e.g., the transmitted carrier power is constant), CPM for some network implementations may be capable of yielding high spectral efficiency due to the phase continuity, and the constant envelope also yields good power efficiency.

In some instances, CPM may be considered as a single carrier waveform without the frequency domain multiplexing. In other instances, CPM may also be considered as a single carrier waveform with frequency domain multiplexing. For example, CPM may be used in association with DFT preceding as CPM-SC-FDMA to achieve both good envelope properties and frequency domain user multiplexing for a system with non-linear distortion. Thus, CPM may provide a simpler multiple access scheme through frequency division and may enable coexistence with adaptive orthogonal frequency division multiple access (OFDMA) and reuse of the OFDMA transceiver structure currently used in OFDMA-based systems. CPM may further enable frequency domain equalization to deal with frequency selective channel. As such, CPM may be a good modulation choice for communications with high specifications on transceiver energy efficiency and/or robustness to non-linear PA, such as at high bandwidth and coverage limited mmW scenarios. In other words, CPM is a modulation technique in which data is encoded in the phase, while the amplitude is constant throughout all transmissions (e.g., including transitions between symbols), such that the impact of the non-linearities may be reduced.

While CPM may exhibit good envelope properties, CPM may also suffer from potential performance loss due to the constraint where the signals are confined on the same envelope, which may result in a reduced minimum (Euclidean) distance. The minimum distance associated with CPM may be used for estimating the error performance of the CPM for moderate and large signal to noise ratio.

As an alternative, to obtain both the benefit and the CPM while striving to achieve better minimum distance, constrained envelope CPM (ceCPM) as well as the multi-amplitude CPM (MACPM) may also be used for a communication network. The ceCPM and the MACPM may generalize the CPM by enabling a controlled small amount of envelope variations to achieve a balance of receiver sensitivity to non-linearity as well as the minimum distance. This may be similar to APSK which strives to achieve the benefits of both QAM and PSK. In some examples, frequency domain user multiplexing or frequency selective channel may not be considered. Aspects presented herein may provide some enhancements on CPM and ceCPM to achieve better user multiplexing as well as the better implementation with frequency selective channel.

In some examples, the normalized baseband signal of CPM is defined as: $s(t, \alpha) = e^{j\phi(t, \alpha)}$, $\phi(t, \alpha) = 2\pi h \Sigma_i \alpha_i g(t-iT)$, h may be chosen as k/p where k and p are co-prime, and q(t) is the phase pulse. With Laurent expansion, the CPM signal may also be written as: $s(t, \alpha) = \Sigma_{k=0}^{N-1} \Sigma_n \alpha_{k,n} g_k(t-nT)$ (e.g., expressed as a linear combination of a finite number of time localized pulses), where T is the symbol time, $\alpha$ is the M-ary information sequence, $\alpha_{k,n}$ are the pseudo-symbols, which are non-linear functions of $\alpha$, and $g_k(t)$ are time localized pulses called Laurent functions. For M-ary information symbols from the set $\alpha_i \in \{\pm 1, \pm 3, \ldots, \pm(M-1)\}$ (e.g., $\alpha_i$ is the data to be transmitted), there may be M−1 principal LFs. For example, the number of LFs may equal to $N=Q^P(2^P-1)$ where $Q=2^{L-1}$ and L is the length of the phase pulse in the CPM signal. The principal LFs may be the largest among the LFs and keeping just the principal LFs may create a continuous phase signal, exhibiting envelope variations and containing a high percentage of the original signal power.

On the other hand, for ceCPM, the goal is not to approximate a CPM signal, but instead the principal LFs are used as a starting point for defining a digital modulation technique that exhibits a small envelope variation, which may be used for achieving an increased minimum Euclidean distance of the signal space. For example, the ceCPM system may use $N_p = M-1$ pulses, the number of principal LFs, with lengths being the lengths of the principal LFs. In other words, signals for ceCPM are based on the M−1 principal LFs: where $s(t, \alpha) = \Sigma_{k=0}^{M-1} \Sigma_n \alpha_{k,n} p_k(t-nT)$, $p_k(t)$ is the ceCPM LFs which are optimally weighted principal LFs of the original CPM signals $p_k(t) = w_k g_k(t)$. The weights $\{w_k\}$ may be designed to maximize the distance under a desired envelope variation. In other words, when signals are generated based on ceCPM, linear expansion is applied to the CPM waveform and just a portion of the resulting principal LFs is used, such that a majority of signals may be captured. Then different weights may be applied to create a different amplitude variation.

Figure 4:
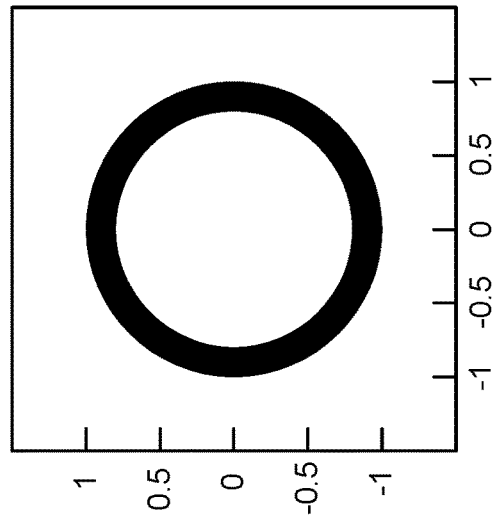
FIG. 4 is a diagram illustrating an example of envelope variation, minimum distance, and corresponding weights of constrained envelope continuous phase modulation (ceCPM) in accordance with various aspects of the present disclosure.

FIG. 4 is a diagram 400 illustrating an example of envelope variation, minimum distance, and corresponding weights of ceCPM in accordance with various aspects of the present disclosure. The diagram shows numerically optimized LFs and an IQ-plot of the resulting ceCPM signal for an example ceCPM scheme, where the envelope of the ceCPM may vary within a small dynamic range of {1.1, 0.9}.

MACPM is a bandwidth efficient modulation technique that may be represented as a sum of two constant amplitude CPM components that have the same modulation index but different amplitudes. In some examples, MACPM may be a generalization of ordinary CPM in which the signal amplitude is allowed to vary over a set of amplitude values while the phase of the signal is constrained to be continuous. As such, the MACPM may be viewed as a subset of constrained envelope CPM signal as well where the constraint with MACPM is on the set of pre-designed amplitude.

Aspects presented herein may improve communications at high bandwidth and/or coverage limited mmW scenarios, which may specify high transceiver energy efficiency and high robustness to non-linear power amplifiers. Aspects presented herein may enable more types of waveforms to be configured between wireless devices, such that communication between wireless devices may be more flexible and can be dynamically changed based on conditions.

In one aspect of the present disclosure, to achieve better envelope properties and frequency domain user multiplexing in the system with non-linear distortion, ceCPM and MACPM may be used with DFT precoding (e.g., as MACPM-SC-FDMA and/or CPM-SC-FDMA, etc.). In other words, ceCPM and/or MACPM may be extended to SC-FDMA.

Figures 5A, 5B:
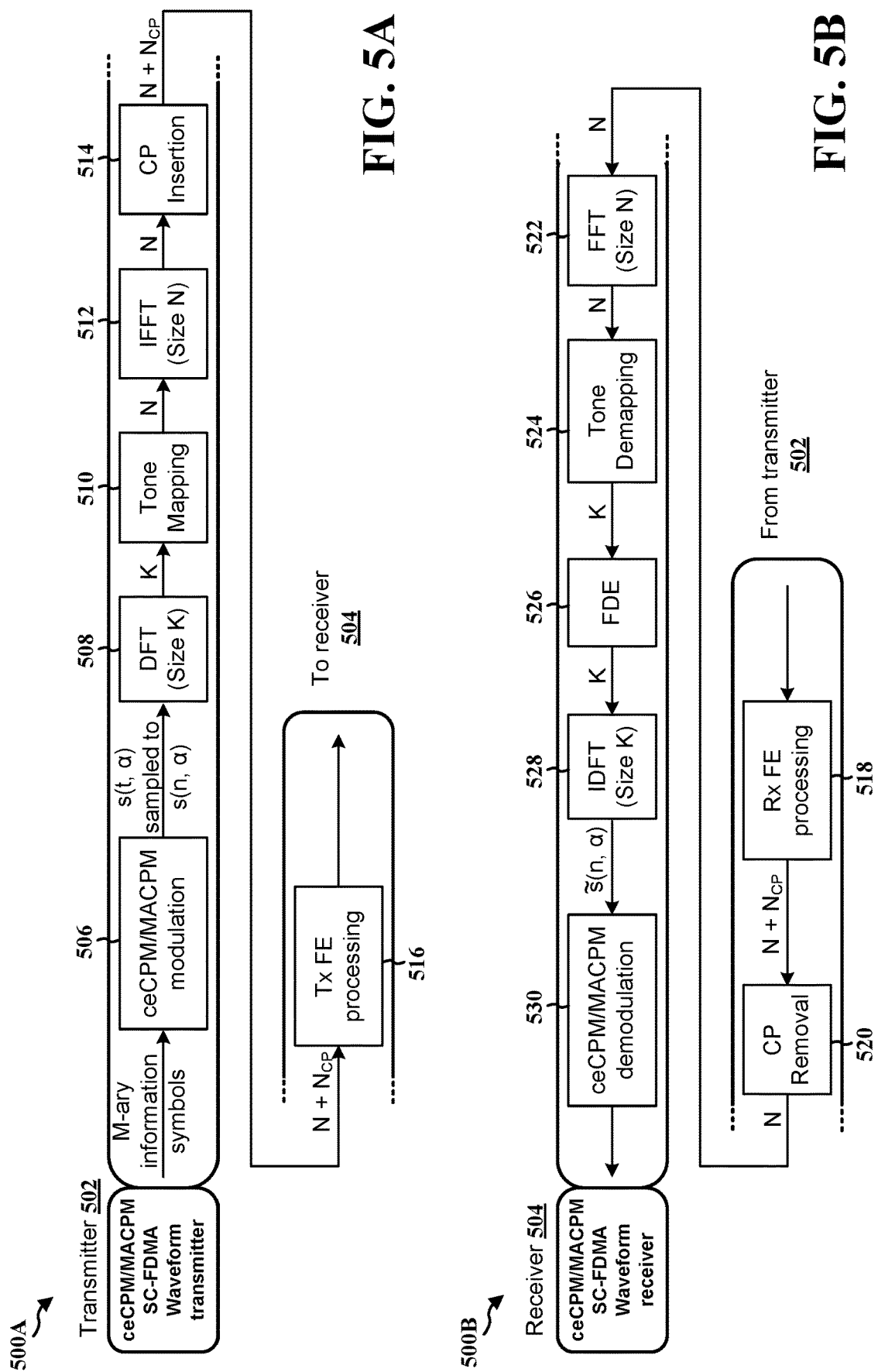
FIG. 5A is a diagram illustrating an example of ceCPM or multiple amplitude continuous phase modulation (MACPM) based DFT precoding at a transceiver in accordance with various aspects of the present disclosure.
FIG. 5B is a diagram illustrating an example of ceCPM/MACPM based discrete Fourier transform (DFT) precoding at a receiver in accordance with various aspects of the present disclosure.

FIGS. 5A and 5B are diagrams 500A and 500B illustrating examples of ceCPM/MACPM based DFT precoding at a transceiver and a receiver, respectively, in accordance with various aspects of the present disclosure.

In one aspect, as shown by the diagram 500A, a transmitter 502 (e.g., an SC-FDMA waveform transmitter) may be configured to transmit a set of data (e.g., M-ary information symbols) to a receiver 504 (e.g., an SC-FDMA waveform receiver). The transmitter 502 or the receiver 504 may be a UE, component(s) of the UE, a base station, and/or component(s) of the base station, etc., which may collectively be referred to as a network node or network nodes.

At 506, the transmitter 502 may first modulate the set of data (e.g., the M-ary information symbols) based on ceCPM and/or MACPM. For example, the set of data may be configured to pass through a ceCPM module or a MACPM module, where a continuous waveform $s(t, \alpha)$ may be sampled to the set of data to convert the set of data to discrete time signals $s(n, \alpha)$. In some examples, the continuous waveform $s(t, \alpha)$ may be represented by: $s(t, \alpha) = \Sigma_{k=0}^{M-1} \Sigma_n \alpha_{k,n} p_k(t-nT)$. To sample the continuous waveform $s(t, \alpha)$ to the discrete time signals $s(n, \alpha)$, the effective rate may be $\log_2(M)/Q$ if a sampling rate of Q is performed, where Q is typically greater than or equal to two (e.g., Q≥2).

At 508, the discrete time signals $s(n, \alpha)$ may pass through a DFT precoder, where the discrete time signals are converted to frequency domain signals of size K.

At 510, the transmitter 502 may map the converted frequency domain signals to a relevant portion of a spectrum (e.g., spread to N sub-carriers). For example, the converted frequency domain signals may pass through a tone mapping block (or a sub-carrier mapping block), where the tone mapping block may determine which part of the spectrum (e.g., sub-carriers) may be used by the transmitter 502 for transmitting the set of data.

At 512, the transmitter 502 may apply inverse fast Fourier transform (IFFT) to the mapped frequency domain signals to convert the mapped frequency domain signals back to SC-FDMA symbols), and a cyclic prefix (CP) (e.g., with a size of $N_{CP}$) may be inserted to the SC-FDMA symbols at 514.

At 516, the transmitter 502 may transmit the SC-FDMA symbols to the receiver 504 after front end (FE) processing (e.g., the SC-FDMA symbols may be amplified and transmitted via one or more antennas of the transmitter 502).

Referring to the diagram 500B of FIG. 5B, at 518, the receiver 504 may receive the SC-FDMA symbols transmitted from the transmitter 502 (e.g., via one or more antennas of the receiver 504).

At 520, the receiver 504 may remove the CP from the received SC-FDMA symbols (e.g., time domain signals), and at 522, the receiver 504 may apply fast Fourier transform (FFT) to convert the SC-FDMA symbols without CP to frequency domain signals.

At 524, the receiver 504 may apply de-mapping to the converted frequency domain signals to obtain the tones or sub-carriers that are allocated for the receiver 504 (e.g., mapped by the transmitter at 510).

At 526, the receiver 504 may apply frequency domain equalization to the frequency domain signals to compensate for channel distortion.

At 528, the receiver 504 may apply inverse discrete Fourier transform (IDFT) to the frequency domain signals to convert the frequency domain signals to discrete time signals š(n, α), such as via an IDFT decoder.

At 530, the receiver 504 may demodulate the discrete time signals š(n, α) based on ceCPM demodulation or MACPM demodulation to obtain the set of data (e.g., the M-ary information symbols) transmitted from the transmitter 502.

Figure 6:
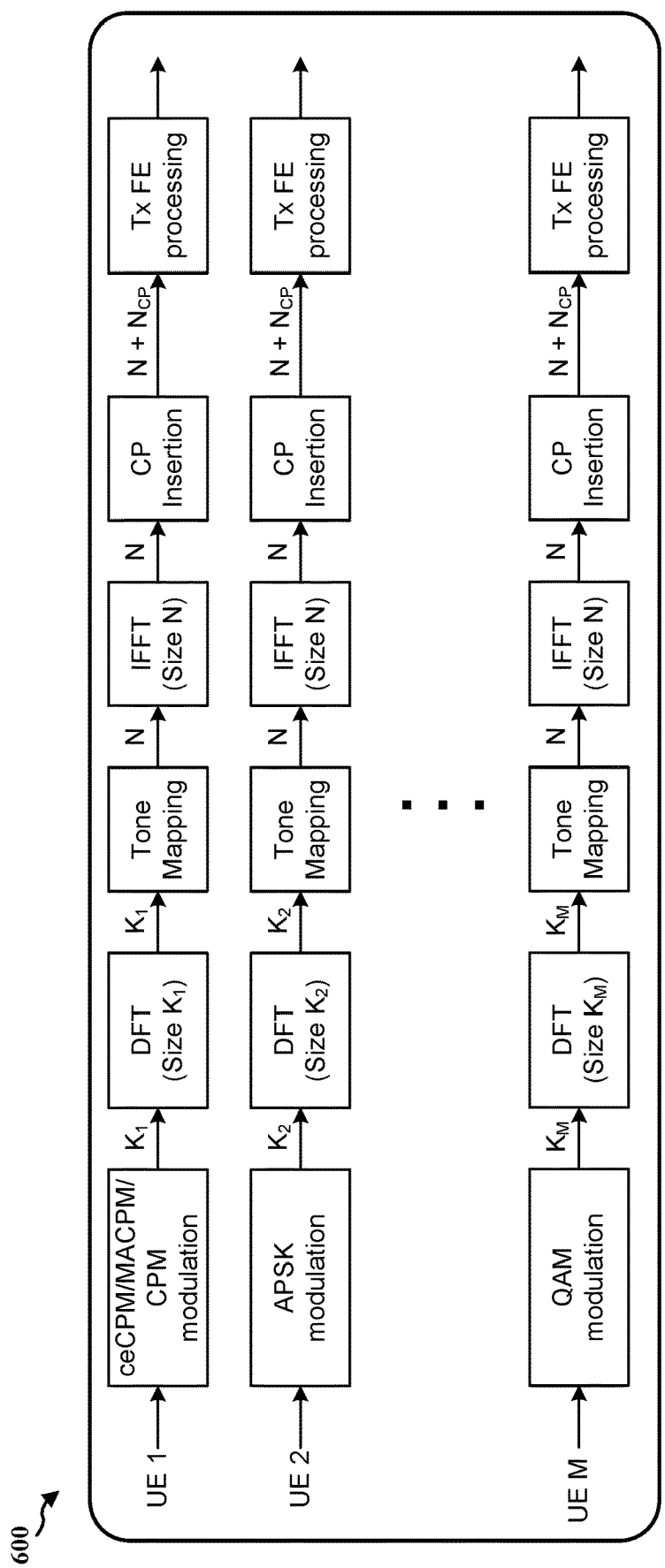
FIG. 6 is a diagram illustrating an example of UEs with different modulations are multiplexed in the frequency domain in accordance with various aspects of the present disclosure.

In another aspect of the present disclosure, with the CPM, ceCPM, and/or MACPM based SC-FDMA, different transmitters with different modulations may be multiplexed in the frequency domain. For example, FIG. 6 is a diagram 600 illustrating an example of UEs with different modulations are multiplexed in the frequency domain in accordance with various aspects of the present disclosure, where up to M UEs with QAM, APSK, CPM, ceCPM, and/or MACPM modulations may be assigned on different subcarriers at the same and/or at different times, such that each of the M UEs may occupy a subset of subcarriers to achieve a more flexible UE multiplexing.

In another aspect of the present disclosure, ceCPM and/or MACPM with different envelope variations may be designed or configured for a communication system or network, and then different transmitters (e.g., UEs) may be assigned with a modulation corresponding to different envelope variations. In one example, for a transmission with strong non-linearity, CPM modulation may be used without any envelope variation. However, for a transmission without large non-linearity, one or more envelope variations with a target tolerance may be applied to the transmission. For example, multiple sets of CPM modulation parameters $\{w_k\}$ may be included in a communication system targeting for different envelope variations and minimum distances.

In some examples, the selection of different CPM modulation parameters $\{w_k\}$ for a given set of data to (e.g., the M-ary information symbols) that is to be transmitted from a transmitter to a receiver may depend on a power headroom report (PHR) from the receiver and/or the MCS and rank of the transmission. For example, a UE may transmit a PHR to a base station, and in response, the base station may indicate the UE to apply one of the modulations (e.g., QAM, APSK, CPM, ceCPM, MACPM, etc.) and/or to apply parameters for the one of the modulations (e.g., CPM modulation parameters $\{w_k\}$) based on the PHR. Similarly, if a base station is scheduling an uplink transmission for a UE, the base station may configure the UE to apply one of the modulations and/or parameters for the one of the modulations based on the MCS and/or rank associated with the uplink transmission. As such, if the modulation is based on CPM, ceCPM, and/or MACPM, a base station may be configured to indicate the corresponding CPM modulation parameter $\{w_k\}$ for a given transmission to a UE.

In another example, a UE may also be configured/or enabled indicate one or more favored modulations and/or favored modulation parameters to a base station based on the UE's operating point, non-linearity, UE capability, capability for different modulations (QAM, APSK, CPM, ceCPM, MACPM, etc.), or a combination thereof. In response, the base station may schedule or configure transmission(s) for the UE accordingly based on the UE's indicated requests.

In some examples, frequency domain equalization (FDE) may be applied to multicarrier systems to enhance transmission rate by reducing transmission redundancy in the form of guard interval (GI). For example, single-carrier frequency domain equalization (SC-FDE) (e.g., a single-carrier (SC) modulation combined with frequency-domain equalization (FDE)) may be used as an approach to mitigate inter-symbol interference (ISI). SC-FDE waveform may be an alternative waveform to DFT-s-OFDM for being a true single carrier waveform with FDE, which may also be a candidate waveform for communication at higher frequency bands. SC-FDE waveform exhibits low PAPR and enables frequency domain equalization with multipath channel. At higher frequency bands, a communication system may be configured or expected to operate with time domain multiplexing due to the short symbol duration as well as the analog beamforming. Thus, FDMA at higher frequency bands may become less important compared to FDMA at lower frequency bands.

In another aspect of the present disclosure, to further reduce PAPR and to provide better resistance to non-linearity as well as FDE, a CPM-FDE waveform, a ceCPM-FDE waveform, and/or a MACPM-FDE waveform may be configured or used for communication systems. For example, FDE may be enabled for CPM/ceCPM/MACPM waveforms to provide a higher flexibility implementation for multipath channel while staying as an SC waveform by inserting a cyclic prefix (CP) and/or GI on top of the CPM/ceCPM/MACPM waveforms. In other words, CP/GI insertion may enable FDE to deal with multipath channels.

Figure 7:
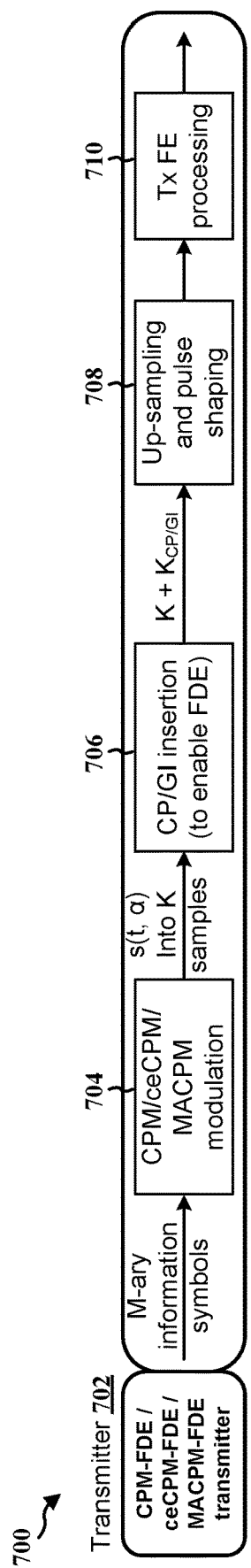
FIG. 7 is a diagram illustrating an example of CPM/ceCPM/MACPM-frequency domain equalization (FDE) transmitter in accordance with various aspects of the present disclosure.

FIG. 7 is a diagram 700 illustrating an example of CPM/ceCPM/MACPM-FDE transmitter in accordance with various aspects of the present disclosure. A transmitter 702 (e.g., a CPM-FDE transmitter, a ceCPM-FDE transmitter, or a MACPM-FDE transmitter) may be configured to transmit a set of data (e.g., M-ary information symbols) to a receiver. The transmitter 702 or the receiver may be a UE, component (s) of the UE, a base station, and/or component(s) of the base station, etc., which may collectively be referred to as a network node or network nodes.

At 704, the transmitter 702 may first modulate the set of data (e.g., the M-ary information symbols) based on CPM, ceCPM, or MACPM, such as described in connection with 506 of FIG. 5A. For example, the set of data may be configured to pass through a CPM module, a ceCPM module, or a MACPM module, where a continuous waveform s(t, a) may be sampled to the set of data to convert the set of data to a modulated signal of size K.

At 706, the transmitter 702 may insert a CP or a GI with a size $K_{CP/GI}$ to the modulated signal to enable FDE, such that the modulated signal with CP/GI has a size of $K+K_{CP/}$ GI. A difference between CP and GI insertion is that GI is a pre-configured common CP waveform among multiple symbols (e.g., hence may be used for tracking, channel estimation, synchronization and/or achieving better system efficiency, etc.), whereas the CP is a symbol specific CP waveform depending on the transmitted data.

At 708, after the CP or GI is inserted to the modulated signal, the transmitter 702 may further apply up-sampling and/or pulse shaping to the modulated signal. The purpose of the up-sampling is to increase the sampling rate of the modulated signal, whereas the purpose of the pulse shaping is to make the modulated signal better suited to the communication channel configured for the transmitter 702 (e.g., such as by limiting the effective bandwidth of the transmission).

At 710, the transmitter 702 may transmit the up-sampled and/or pulse shaped modulated signal to the receiver after FE processing (e.g., the modulated signal may be amplified and transmitted via one or more antennas of the transmitter 702). In some examples, different type of waveforms may also be used at different slot for same and/or different UEs/channels. After the receiver receives the up-sampled and/or pulse shaped modulated signal, the receiver may remove the CP/GI and apply FDE to the modulated signal.

Figure 8:
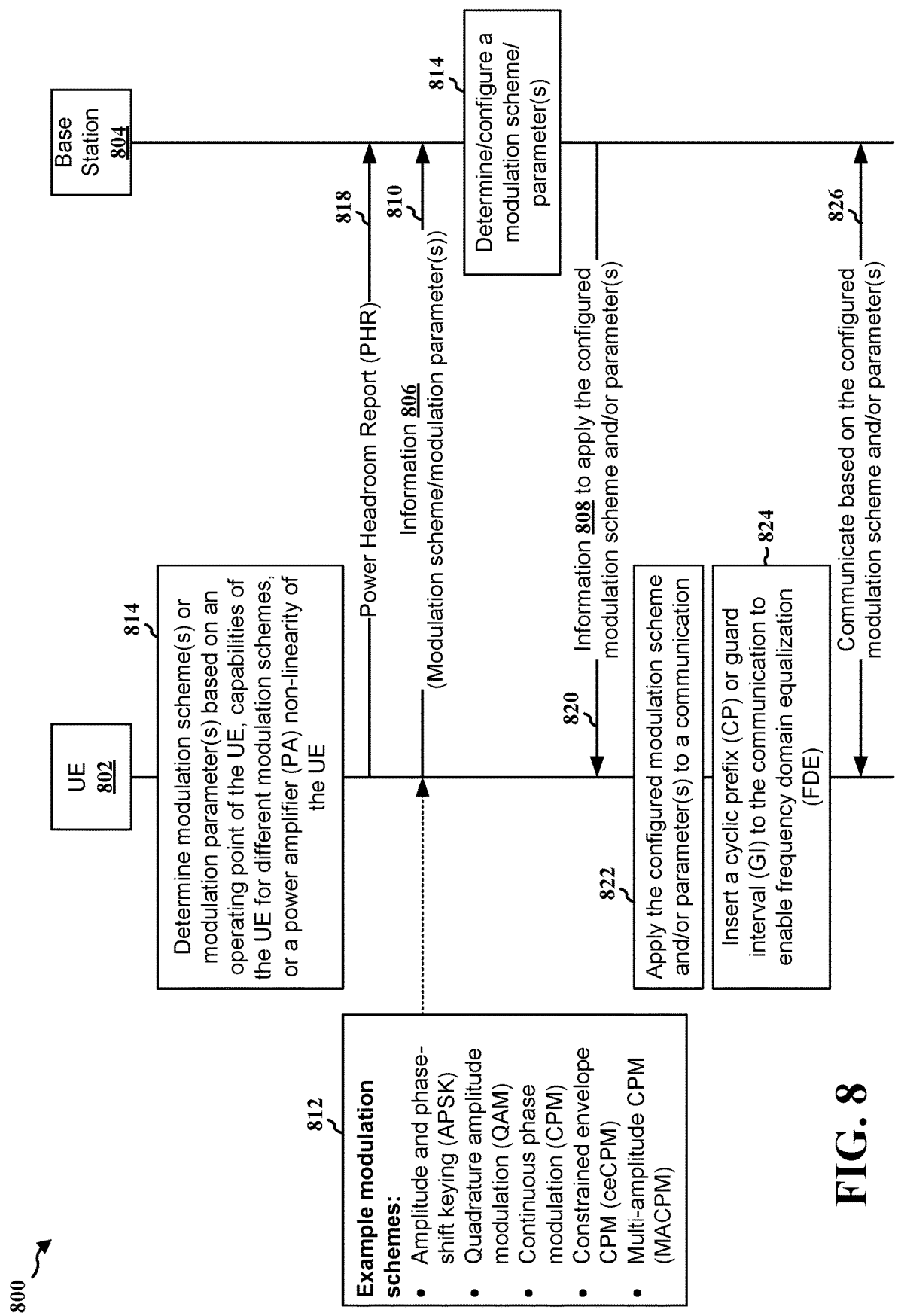
FIG. 8 is a communication flow illustrating an example of configuring a UE with a modulation scheme and/or parameter(s) associated with the modulation scheme in accordance with various aspects of the present disclosure.

FIG. 8 is a communication flow 800 illustrating an example of configuring a UE with a modulation scheme and/or parameter(s) associated with the modulation scheme in accordance with various aspects of the present disclosure. The numberings associated with the communication flow 800 do not specify a particular temporal order and are merely used as references for the communication flow 800. Aspects presented herein may enable a UE to indicate one or more modulation schemes to a base station (or component(s) of the base station), and the base station may configure a modulation scheme and/or modulation parameter(s) for the UE based on the UE's indication and/or based on other condition(s). In one example, a modulation scheme may be associated with modulation size (i.e., the value of the M as described in connection with FIG. 6) which translates into how many bits each modulation may carry. For example, 16-QAM, 16-APSK or CPM/CeCPM/MACPM with 16-ary may carry 4-bit information per modulation (i.e., M=16). This may specify higher SNR compared to M=4 (i.e., QPSK, CPM with 4-ary, etc.). In another example, a modulation scheme may be associated with a best modulation scheme for a given modulation size (e.g., for a given M). For example, a UE with a powerful PA may prefer QAM, whereas a UE that is limited by PA non-linearity may prefer CPM with M-ary, even at similar SNR operating point.

At 810, a UE 802 (or a component of the UE 802) may transmit information 806 indicative of at least a modulation scheme and/or a modulation parameter that is associated with the modulation scheme to a base station 804 (or a component/disaggregated unit of the base station 804). In one example, as shown at 812, the UE 802 may determine (e.g., select) the modulation scheme from a set of modulation schemes, which may include APSK, QAM, CPM, ceCPM, MACPM, or a combination thereof. In another example, as shown at 814, the UE may determine the modulation scheme and/or the modulation parameter based on the operating point of the UE 802, capabilities of the UE 802 for different modulation schemes, and/or the PA non-linearity of the UE 802, etc. For example, some UEs may have the capability to support QAM but not APSK or CPM signals as QAM signals have been used in previous wireless communication generations (e.g., 3G, 4G, 5G, etc.). On the other hand, other modulation schemes presented herein, such as APSK or CPM, may not be supported by all UEs as they may specify change on demodulation.

At 816, after the base station 804 receives the information 806, the base station 804 may determine or configure a modulation scheme and/or modulation parameter(s) associated with the configured modulation scheme for the UE 802 based on the information 806.

In one example, the base station 804 may determine the modulation scheme and/or the modulation parameter(s) associated with the configured modulation scheme further based on the MCS and/or the rank associated with the communication between the UE 802 and the base station, such as the MCS and/or the rank for an uplink transmission (e.g., PUSCH) or a downlink transmission (e.g., PDSCH).

In another example, as shown at 818, the UE 802 may be configured to transmit its power headroom report (PHR) to the base station 804. In response, the base station 804 may determine the modulation scheme and/or modulation parameter(s) associated with the configured modulation scheme further based on the PHR from the UE 802.

At 820, the base station 804 may transmit information 808 to the UE 802 to inform/configure the UE 802 to apply a configured modulation scheme and/or a configured modulation parameter associated with the configured modulation scheme to at least one subsequent communication.

At 822, after receiving the information 808 from the base station 804, the UE 802 may apply the configured modulation scheme and/or the configured modulation parameter associated with the configured modulation scheme to at least one subsequent communication. In one example, as shown at 824, to enable FDE, the UE 802 may additionally insert at least one CP or GI to the at least one subsequent communication, such as described in connection with FIG. 7. As such, the UE 802 may transmit the at least one subsequent communication without applying DFT to the at least one subsequent transmission, and the base station 804 may apply FDE to the at least one communication received from the UE 802.

At 826, the UE 802 may communicate with the base station 804 based on the configured modulation scheme and/or parameters. For example, at 810, the UE 802 may transmit the information 806 to the base station 804 indicating a desire to use ceCPM and/or MACPM for at least one subsequent communication. The information 806 may further include one or more modulation parameters associated with the ceCPM and/or MACPM, such as the envelope variation and/or the minimum transmission distance for the ceCPM and/or MACPM. Then, at 814, the base station 804 may configure ceCPM or MACPM and additionally modulation parameters associated with the ceCPM or MACPM for at least one subsequent communication between the UE 802 and the base station 804. At 820, the base station 804 may transmit the information 808 to the UE 802 informing the UE 802 to apply the ceCPM or MACPM determined by the base station 804, and additionally one or more modulation parameters associated with the ceCPM or MACPM. Then, at 826, the UE 802 may communicate with the base station 804 based on ceCPM or MACPM with the configured modulation parameters (if they are included in the information 808), such as modulating an uplink transmission with ceCPM or MACPM or demodulating a downlink transmission based on ceCPM or MACPM, etc.

Figure 9:
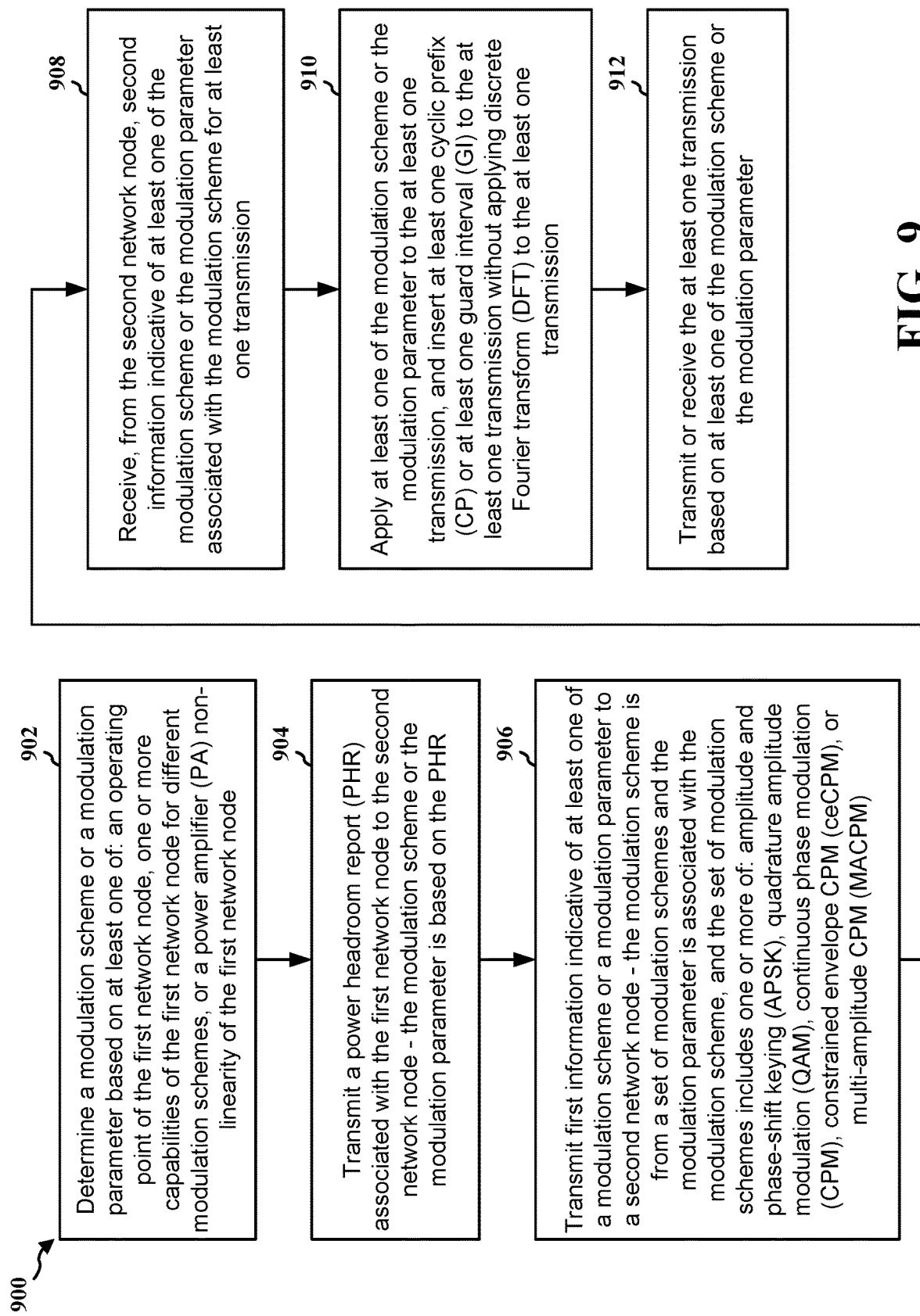
FIG. 9 is a flowchart of a method of wireless communication.

FIG. 9 is a flowchart 900 of a method of wireless communication. The method may be performed by a first network node (e.g., the UE 104, 802; the transmitter 502, 702; the apparatus 1104). The method may enable the first network node to indicate one or more favored/suitable modulation schemes to a second network node, and receive a modulation scheme/parameter configuration from the second network node based on the indication.

At 902, the first network node may determine the modulation scheme or the modulation parameter based on at least one of: an operating point of the first network node, one or more capabilities of the first network node for different modulation schemes, or a PA non-linearity of the first network node, such as described in connection with FIG. 8. For example, at 814, the UE 802 may determine modulation scheme(s) or modulation parameter(s) based on an operating point of the UE 802, capabilities of the UE 802 for different modulation schemes, or a PA non-linearity of the UE 802. The determination of the modulation scheme or the modulation parameter may be performed by, e.g., the modulation process component 198 of the apparatus 1104 in FIG. 11.

At 904, the first network node may transmit a PHR associated with the first network node to the second network node, where the modulation scheme or the modulation parameter is based on the PHR, such as described in connection with FIG. 8. For example, at 818, the UE 802 may transmit a PHR associated with the UE 802 to the base station 804. The transmission of the PHR may be performed by, e.g., the modulation process component 198 and/or the cellular RF transceiver 1122 of the apparatus 1104 in FIG. 11.

At 906, the first network node may transmit first information indicative of at least one of a modulation scheme or a modulation parameter to a second network node, where the modulation scheme is from a set of modulation schemes and the modulation parameter is associated with the modulation scheme, and where the set of modulation schemes includes one or more of: APSK, QAM, CPM, ceCPM, or MACPM, such as described in connection with FIG. 8. For example, at 810, the UE 802 may transmit information 810 to the base station 804, where the information 810 may indicate at least one modulation scheme and/or a modulation parameter, and the modulation scheme may include one or more of: APSK, QAM, CPM, ceCPM, or MACPM as shown at 812. The transmission of the information may be performed by, e.g., the modulation process component 198 and/or the cellular RF transceiver 1122 of the apparatus 1104 in FIG. 11.

In one example, the first network node includes a UE or one or more components of the UE, and the second network node includes a base station or one or more components of the base station.

In another example, the modulation scheme is associated with the ceCPM scheme or the MACPM scheme.

At 908, the first network node may receive, from the second network node, second information indicative of at least one of the modulation scheme or the modulation parameter associated with the modulation scheme for at least one transmission, such as described in connection with FIG. 8. For example, at 820, the UE 802 may receive the information 808 from the base station 804 to apply a modulation scheme or a modulation parameter associated with the modulation scheme based on the information 806. The reception of the message may be performed by, e.g., the modulation process component 198 and/or the cellular RF transceiver 1122 of the apparatus 1104 in FIG. 11.

In one example, the modulation scheme or the modulation parameter is based on an MCS or a rank associated with the at least one transmission.

In another example, the modulation parameter is based on an envelope variation or a minimum transmission distance for the at least one transmission.

At 910, the first network node may apply at least one of the modulation scheme or the modulation parameter to the at least one transmission, and insert at least one CP or at least one GI to the at least one transmission without applying DFT to the at least one transmission, such as described in connection with FIG. 8. For example, at 822 and 824, the UE 802 may apply the modulation scheme and/or parameter(s) to a communication and insert a CP or GI to the communication without DFT to enable FDE. The application of the modulation scheme or the modulation parameter and/or the insertion of the at least one CP or the at least one GI to the at least one transmission without applying DFT may be performed by, e.g., the modulation process component 198 of the apparatus 1104 in FIG. 11.

At 912, the first network node may transmit or receive the at least one transmission based on at least one of the modulation scheme or the modulation parameter, such as described in connection with FIG. 8. For example, at 826, the UE 802 may communicate with the base station 804 based on the modulation scheme and/or parameter(s). The transmission or reception of the at least one transmission may be performed by, e.g., the modulation process component 198 and/or the cellular RF transceiver 1122 of the apparatus 1104 in FIG. 11.

Figure 10:
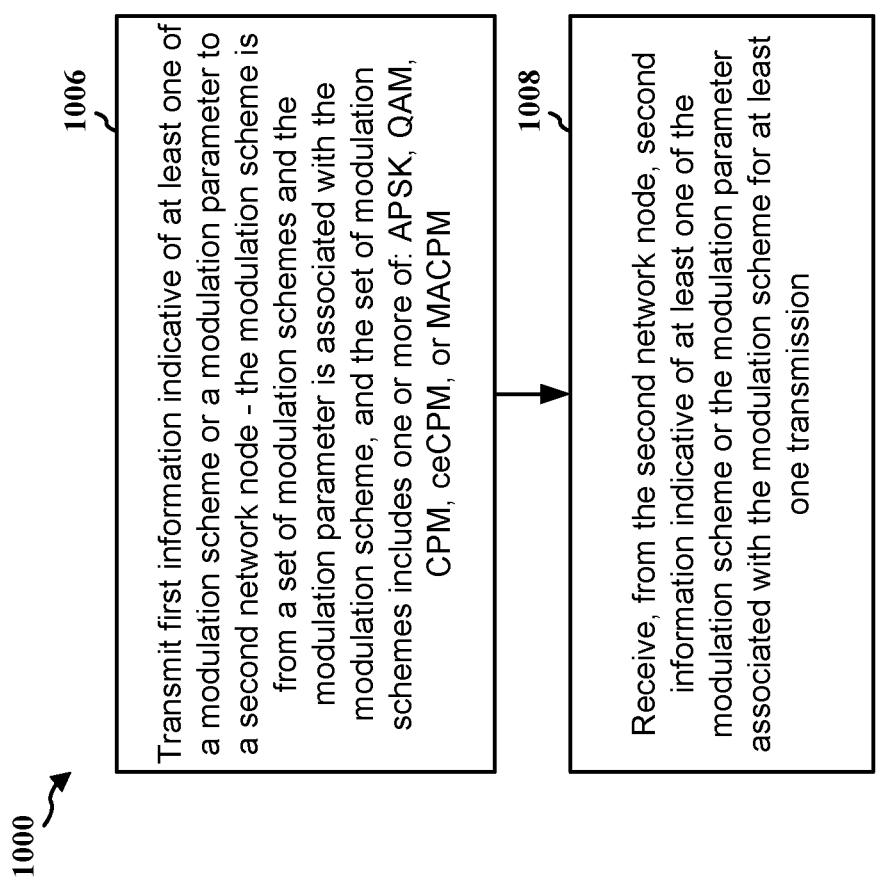
FIG. 10 is a flowchart of a method of wireless communication.

FIG. 10 is a flowchart 1000 of a method of wireless communication. The method may be performed by a first network node (e.g., the UE 104, 802; the transmitter 502, 702; the apparatus 1104). The method may enable the first network node to indicate one or more modulation schemes to a second network node, and receive a modulation scheme/parameter configuration from the second network node based on the indication.

At 1006, the first network node may transmit first information indicative of at least one of a modulation scheme or a modulation parameter to a second network node, where the modulation scheme is from a set of modulation schemes and the modulation parameter is associated with the modulation scheme, and where the set of modulation schemes includes one or more of: APSK, QAM, CPM, ceCPM, or MACPM, such as described in connection with FIG. 8. For example, at 810, the UE 802 may transmit information 810 to the base station 804, where the information 810 may indicate at least one modulation scheme and/or a modulation parameter, and the modulation scheme may include one or more of: APSK, QAM, CPM, ceCPM, or MACPM as shown at 812. The transmission of the information may be performed by, e.g., the modulation process component 198 and/or the cellular RF transceiver 1122 of the apparatus 1104 in FIG. 11.

In one example, the first network node includes a UE or one or more components of the UE and the second network node includes a base station or one or more components of the base station.

In another example, the first network node may determine the modulation scheme or the modulation parameter based on at least one of: an operating point of the first network node, one or more capabilities of the first network node for different modulation schemes, or a PA non-linearity of the first network node, such as described in connection with FIG. 8. For example, at 814, the UE 802 may determine modulation scheme(s) or modulation parameter(s) based on an operating point of the UE 802, capabilities of the UE 802 for different modulation schemes, or a PA non-linearity of the UE 802. The determination of the modulation scheme or the modulation parameter may be performed by, e.g., the modulation process component 198 of the apparatus 1104 in FIG. 11.

In another example, the modulation scheme is associated with the ceCPM scheme or the MACPM scheme.

At 1008, the first network node may receive, from the second network node, second information indicative of at least one of the modulation scheme or the modulation parameter associated with the modulation scheme for at least one transmission, such as described in connection with FIG. 8. For example, at 820, the UE 802 may receive the information 808 from the base station 804 to apply a modulation scheme or a modulation parameter associated with the modulation scheme based on the information 806. The reception of the message may be performed by, e.g., the modulation process component 198 and/or the cellular RF transceiver 1122 of the apparatus 1104 in FIG. 11.

In one example, the modulation scheme or the modulation parameter is based on an MCS or a rank associated with the at least one transmission.

In another example, the modulation parameter is based on an envelope variation or a minimum transmission distance for the at least one transmission.

In another example, the first network node may transmit a PHR associated with the first network node to the second network node, where the modulation scheme or the modulation parameter is based on the PHR, such as described in connection with FIG. 8. For example, at 818, the UE 802 may transmit a PHR associated with the UE 802 to the base station 804. The transmission of the PHR may be performed by, e.g., the modulation process component 198 and/or the cellular RF transceiver 1122 of the apparatus 1104 in FIG. 11.

In another example, the first network node may apply at least one of the modulation scheme or the modulation parameter to the at least one transmission, and insert at least one CP or at least one GI to the at least one transmission without applying DFT to the at least one transmission, such as described in connection with FIG. 8. For example, at 822 and 824, the UE 802 may apply the modulation scheme and/or parameter(s) to a communication and insert a CP or GI to the communication without DFT to enable FDE. The application of the modulation scheme or the modulation parameter and/or the insertion of the at least one CP or the at least one GI to the at least one transmission without applying DFT may be performed by, e.g., the modulation process component 198 of the apparatus 1104 in FIG. 11.

In another example, the first network node may transmit or receive the at least one transmission based on at least one of the modulation scheme or the modulation parameter, such as described in connection with FIG. 8. For example, at 826, the UE 802 may communicate with the base station 804 based on the modulation scheme and/or parameter(s). The transmission or reception of the at least one transmission may be performed by, e.g., the modulation process component 198 and/or the cellular RF transceiver 1122 of the apparatus 1104 in FIG. 11.

Figure 11:
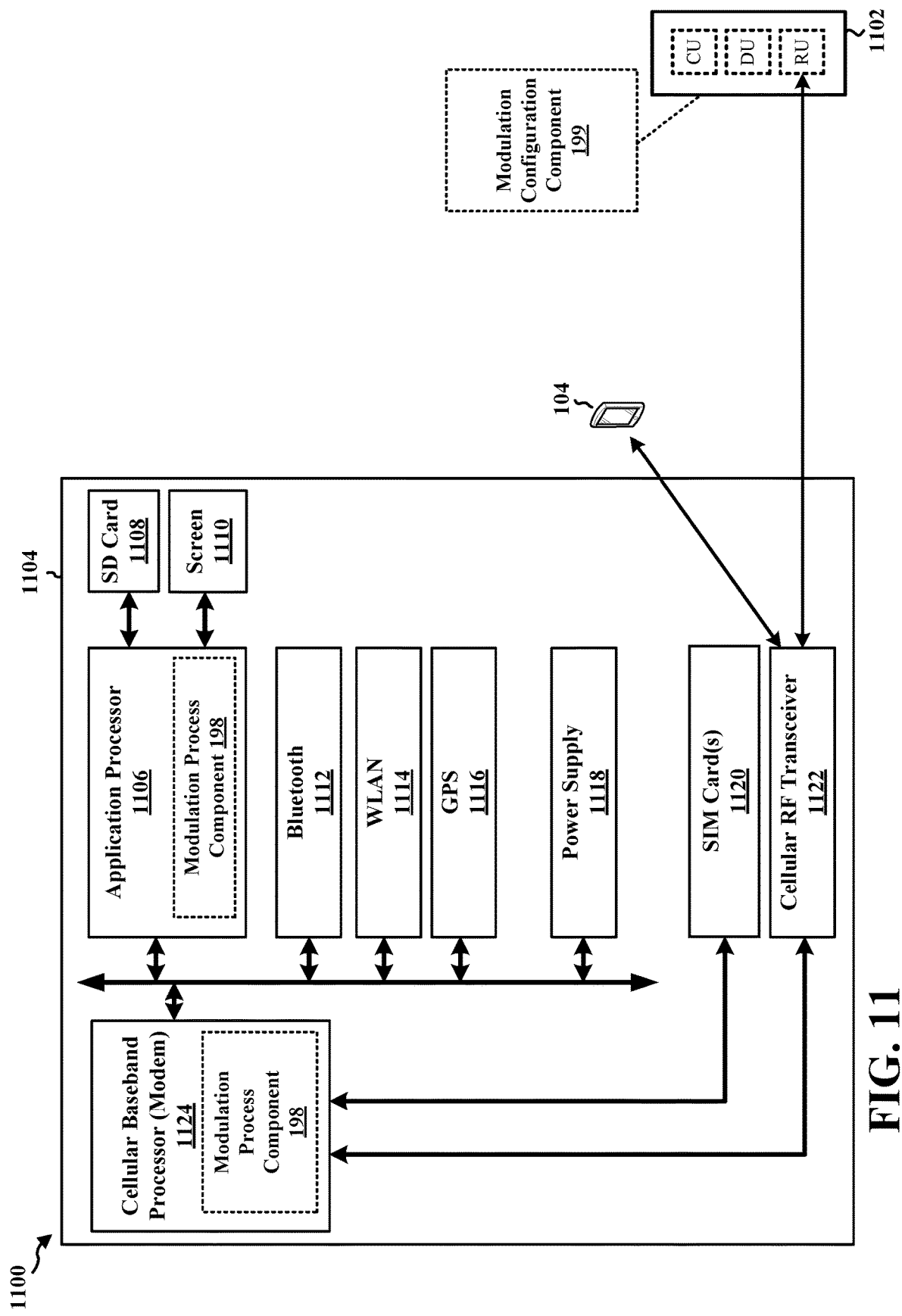
FIG. 11 is a diagram illustrating an example of a hardware implementation for an example apparatus and/or network entity.

FIG. 11 is a diagram 1100 illustrating an example of a hardware implementation for an apparatus 1104 and a network entity 1102. The apparatus 1104 may be a UE, a component of a UE, or may implement UE functionality. The network entity 1102 may be a BS, a component of a BS, or may implement BS functionality. In some aspects, the apparatus 1104 may include a cellular baseband processor 1124 (also referred to as a modem) coupled to a cellular RF transceiver 1122. In some aspects, the apparatus 1104 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1124 communicates through the cellular RF transceiver 1122 with the UE 104 and/or with an RU associated with the network entity 1102. The RU is either part of the network entity 1102 or is in communication with the network entity 1102. The network entity 1102 may include one or more of the CU, DU, and the RU. The cellular baseband processor 1124 and the application processor 1106 may each include a computer-readable medium/memory. Each computer-readable medium/memory may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the modulation process component 198 is configured to transmit first information indicative of at least one of a modulation scheme or a modulation parameter to a second network node, where the modulation scheme is from a set of modulation schemes and the modulation parameter is associated with the modulation scheme, and where the set of modulation schemes includes one or more of: APSK, QAM, CPM, ceCPM, or MACPM, and receive, from the second network node, second information indicative of at least one of the modulation scheme or the modulation parameter associated with the modulation scheme for at least one transmission. The modulation process component 198 may be within the cellular baseband processor 1124, the application processor 1106, or both the cellular baseband processor 1124 and the application processor 1106. The modulation process component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for transmitting first information indicative of at least one of a modulation scheme or a modulation parameter to a second network node, where the modulation scheme is from a set of modulation schemes and the modulation parameter is associated with the modulation scheme, and where the set of modulation schemes includes one or more of: APSK, QAM, CPM, ceCPM, or MACPM. The apparatus 1104 may also include means for receiving, from the second network node, second information indicative of at least one of the modulation scheme or the modulation parameter associated with the modulation scheme for at least one transmission. The apparatus 1104 may also include means for determining the first modulation scheme or the first modulation parameter based on at least one of: an operating point of the first network node, one or more capabilities of the first network node for different modulation schemes, or a PA non-linearity of the first network node. The apparatus 1104 may also include means for transmitting a PHR associated with the first network node to the second network node, where the modulation scheme or the modulation parameter is based on the PHR. The apparatus 1104 may also include means for transmitting or receiving the at least one transmission based on at least one of the modulation scheme or the modulation parameter. The apparatus 1104 may also include means for applying at least one of the modulation scheme or the modulation parameter to the at least one transmission. The apparatus 1104 may also include means for inserting at least one CP or at least one GI to the at least one transmission without applying DFT to the at least one transmission. The apparatus 1104 may also include and means for performing FDE for the at least one transmission.

The means may be the modulation process component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
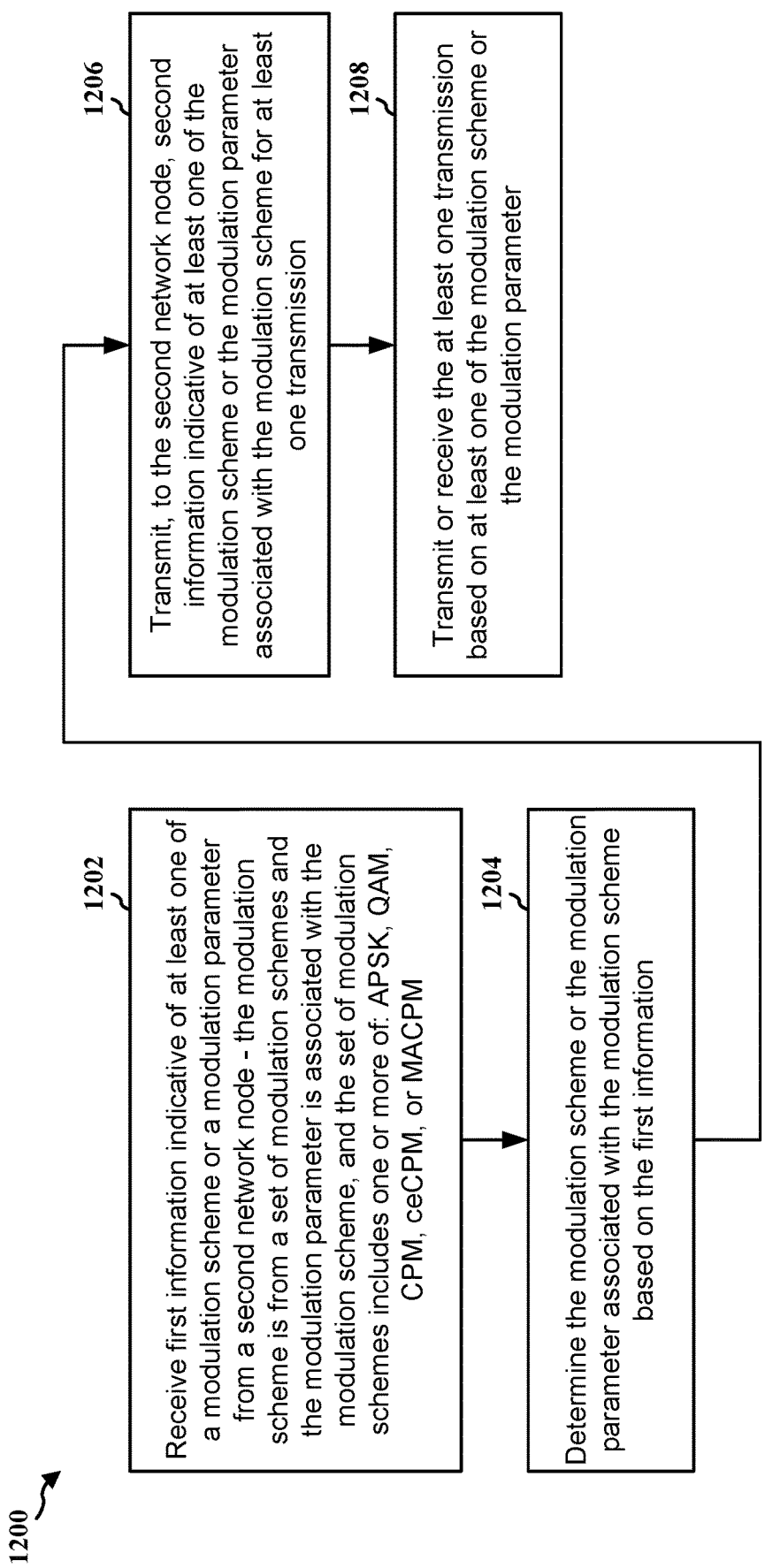
FIG. 12 is a flowchart of a method of wireless communication.

FIG. 12 is a flowchart 1200 of a method of wireless communication. The method may be performed by a first wireless node (e.g., the base station 102, 804; the receiver 504; the network entity 1402). The method map may enable the first wireless node to receive information from a second wireless node indicative of one or more modulation schemes, and in response, the first wireless node may configure a modulation scheme and/or related modulation parameters for the second wireless node based on the information.

At 1202, the first wireless node may receive first information indicative of at least one of a modulation scheme or a modulation parameter from a second network node, where the modulation scheme is from a set of modulation schemes and the modulation parameter is associated with the modulation scheme, and where the set of modulation schemes includes one or more of: APSK, QAM, CPM, ceCPM, or MACPM, such as described in connection with FIG. 8. For example, at 810, the base station 804 may receive information 806 from the UE 802 that indicates at least one of a modulation scheme or a modulation parameter, where the modulation scheme is determined from a set of modulation schemes including one or more of: APSK, QAM, CPM, ceCPM, or MACPM. The reception of the information may be performed by, e.g., the modulation configuration component 199 and/or the cellular RF transceiver 1422 of the network entity 1402 in FIG. 14.

In one example, the second network node includes a UE or one or more components of the UE and the first network node includes a base station or one or more components of the base station.

In another example, the modulation scheme or the modulation parameter is based on at least one of: an operating point of the second network node, one or more capabilities of the second network node for different modulation schemes, or a PA non-linearity of the second network node.

In another example, the modulation scheme is associated with the ceCPM scheme or the MACPM scheme.

In another example, the modulation parameter is based on an envelope variation or a minimum transmission distance for the at least one transmission.

At 1204, the first wireless node may determine the modulation scheme or the modulation parameter associated with the modulation scheme based on the first information, such as described in connection with FIG. 8. For example, at 814, the base station 804 may determine a modulation scheme or a modulation parameter associated with the modulation scheme based on the information 806. The determination of the modulation scheme or the modulation parameter may be performed by, e.g., the modulation configuration component 199 of the network entity 1402 in FIG. 14.

In one example, the first wireless node may receive a PHR associated with the first network node from the first network node, and the first wireless node may determine the modulation scheme or the modulation parameter based on the PHR.

In another example, the first wireless node may determine the modulation scheme or the modulation parameter based on an MCS or a rank associated with the at least one transmission.

At 1206, the first wireless node may transmit, to the second network node, second information indicative of at least one of the modulation scheme or the modulation parameter associated with the modulation scheme for at least one transmission, such as described in connection with FIG. 8. For example, at 820, the base station 804 may transmit the information 808 to the UE 802 to inform the UE 802 to apply a modulation scheme or a modulation parameter associated with the modulation scheme. The transmission of the message may be performed by, e.g., the modulation configuration component 199 and/or the cellular RF transceiver 1422 of the network entity 1402 in FIG. 14.

At 1208, the first wireless node may transmit or receive the at least one transmission based on at least one of the modulation scheme or the modulation parameter, such as described in connection with FIG. 8. For example, at 826, the base station 804 may communicate with the UE 802 based on the modulation scheme and/or the modulation parameter. The transmission or reception of the at least one transmission may be performed by, e.g., the modulation configuration component 199 and/or the cellular RF transceiver 1422 of the network entity 1402 in FIG. 14.

Figure 13:
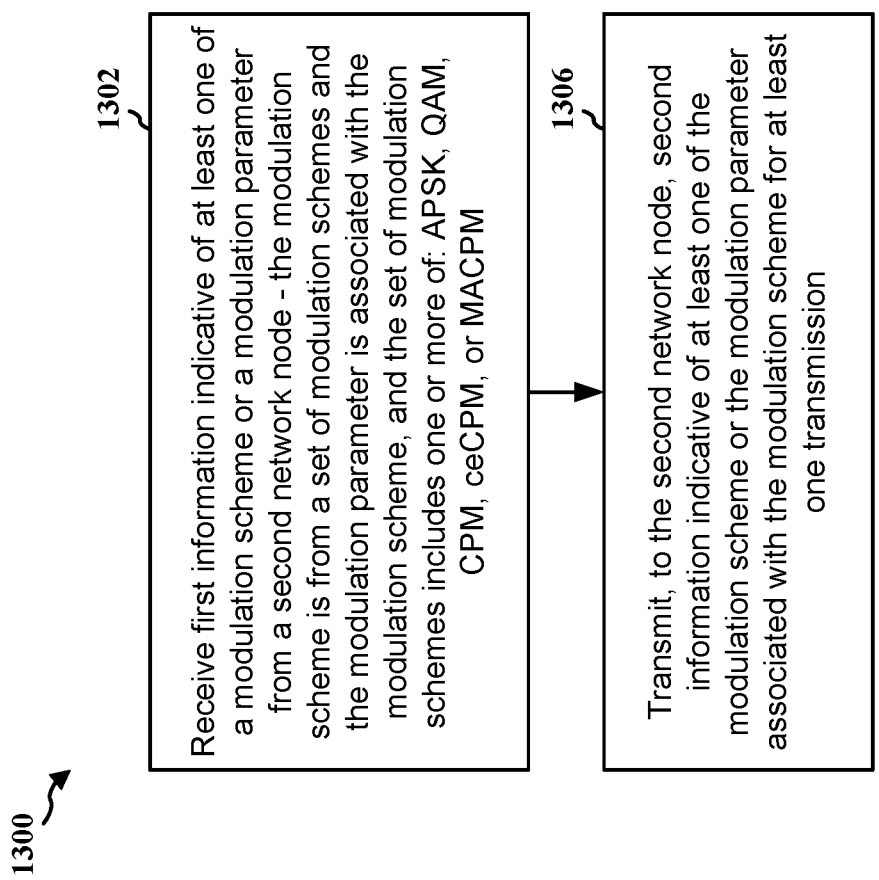
FIG. 13 is a flowchart of a method of wireless communication.

FIG. 13 is a flowchart 1300 of a method of wireless communication. The method may be performed by a first wireless node (e.g., the base station 102, 804; the receiver 504; the network entity 1402). The method map may enable the first wireless node to receive information from a second wireless node indicative of one or more favored/modulation schemes, and in response, the first wireless node may configure a modulation scheme and/or related modulation parameters based on the information.

At 1302, the first wireless node may receive first information indicative of at least one of a modulation scheme or a modulation parameter from a second network node, where the modulation scheme is from a set of modulation schemes and the modulation parameter is associated with the modulation scheme, and where the set of modulation schemes includes one or more of: APSK, QAM, CPM, ceCPM, or MACPM, such as described in connection with FIG. 8. For example, at 810, the base station 804 may receive information 806 from the UE 802 that indicates at least one of a modulation scheme or a modulation parameter, where the modulation scheme is determined from a set of modulation schemes including one or more of: APSK, QAM, CPM, ceCPM, or MACPM. The reception of the information may be performed by, e.g., the modulation configuration component 199 and/or the cellular RF transceiver 1422 of the network entity 1402 in FIG. 14.

In one example, the second network node includes a UE or one or more components of the UE and the first network node includes a base station or one or more components of the base station.

In another example, the modulation scheme or the modulation parameter is based on at least one of: an operating point of the first network node, one or more capabilities of the first network node for different modulation schemes, or a PA non-linearity of the first network node.

In another example, the modulation scheme is associated with the ceCPM scheme or the MACPM scheme.

In another example, the modulation parameter is based on an envelope variation or a minimum transmission distance for the at least one transmission.

In another example, the first wireless node may determine the modulation scheme or the modulation parameter associated with the modulation scheme based on the first information, such as described in connection with FIG. 8. For example, at 814, the base station 804 may determine a modulation scheme or a modulation parameter associated with the modulation scheme based on the information 806. The determination of the modulation scheme or the modulation parameter may be performed by, e.g., the modulation configuration component 199 of the network entity 1402 in FIG. 14.

In one example, the first wireless node may receive a PHR associated with the first network node from the first network node, and the first wireless node may determine the modulation scheme or the modulation parameter based on the PHR.

In another example, the first wireless node may determine the modulation scheme or the modulation parameter based on an MCS or a rank associated with the at least one transmission.

At 1306, the first wireless node may transmit, to the second network node, second information indicative of at least one of the modulation scheme or the modulation parameter associated with the modulation scheme for at least one transmission, such as described in connection with FIG. 8. For example, at 820, the base station 804 may transmit the information 808 to the UE 802 to inform the UE 802 to apply a modulation scheme or a modulation parameter associated with the modulation scheme. The transmission of the message may be performed by, e.g., the modulation configuration component 199 and/or the cellular RF transceiver 1422 of the network entity 1402 in FIG. 14.

In one example, the first wireless node may transmit or receive the at least one transmission based on at least one of the modulation scheme or the modulation parameter, such as described in connection with FIG. 8. For example, at 826, the base station 804 may communicate with the UE 802 based on the modulation scheme and/or the modulation parameter. The transmission or reception of the at least one transmission may be performed by, e.g., the modulation configuration component 199 and/or the cellular RF transceiver 1422 of the network entity 1402 in FIG. 14.

Figure 14:
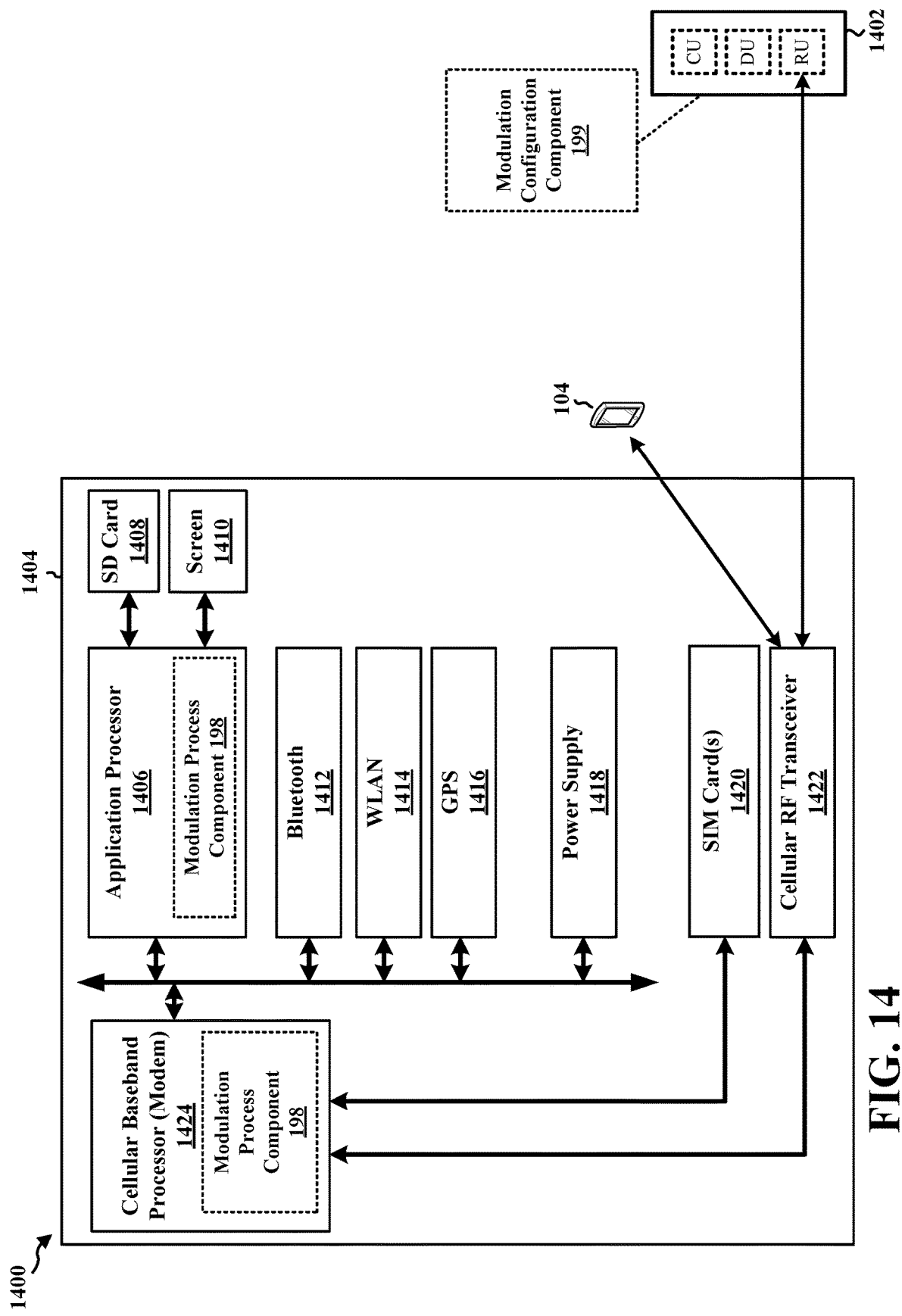
FIG. 14 is a diagram illustrating an example of a hardware implementation for an example apparatus and/or network entity.

FIG. 14 is a diagram 1400 illustrating an example of a hardware implementation for an apparatus 1404 and a network entity 1402. The apparatus 1404 may be a UE, a component of a UE, or may implement UE functionality. The network entity 1402 may be a BS, a component of a BS, or may implement BS functionality. In some aspects, the apparatus 1404 may include a cellular baseband processor 1424 (also referred to as a modem) coupled to a cellular RF transceiver 1422. In some aspects, the apparatus 1404 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1424 communicates through the cellular RF transceiver 1422 with the UE 104 and/or with an RU associated with the network entity 1402. The RU is either part of the network entity 1402 or is in communication with the network entity 1402. The network entity 1402 may include one or more of the CU, DU, and the RU. The cellular baseband processor 1424 and the application processor 1406 may each include a computer-readable medium/memory. Each computer-readable medium/memory may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the modulation configuration component 199 is configured to receive first information indicative of at least one of a modulation scheme or a modulation parameter from a second network node, where the modulation scheme is from a set of modulation schemes and the modulation parameter is associated with the modulation scheme, and where the set of modulation schemes includes one or more of: APSK, QAM, CPM, ceCPM, or MACPM; and transmit, to the second network node, second information indicative of at least one of the modulation scheme or the modulation parameter associated with the modulation scheme for at least one transmission. The modulation configuration component 199 may be within one or more processors (e.g., BBU(s)) of one or more of the CU, DU, and the RU. The modulation configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for receiving first information indicative of at least one of a modulation scheme or a modulation parameter from a second network node, where the modulation scheme is from a set of modulation schemes and the modulation parameter is associated with the modulation scheme, and where the set of modulation schemes includes one or more of: APSK, QAM, CPM, ceCPM, or MACPM. The network entity 1402 also includes means for transmitting, to the second network node, second information indicative of at least one of the modulation scheme or the modulation parameter associated with the modulation scheme for at least one transmission. The network entity 1402 also includes means for determining the modulation scheme or the modulation parameter associated with the modulation scheme based on the first information. The network entity 1402 also includes means for transmitting or receiving the at least one transmission based on at least one of the modulation scheme or the modulation parameter. The network entity 1402 also includes means for receiving a PHR associated with the first network node from the first network node. The network entity 1402 also includes means for determining the modulation scheme or the modulation parameter based on the PHR. The network entity 1402 also includes means for determining the modulation scheme or the modulation parameter based on an MCS or a rank associated with the at least one transmission.

The means may be the modulation configuration component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication including: a memory; and at least one processor coupled to the memory and the at least one processor is configured to: transmit first information indicative of at least one of a modulation scheme or a modulation parameter to a second network node, where the modulation scheme is from a set of modulation schemes and the modulation parameter is associated with the modulation scheme, and where the set of modulation schemes includes one or more of: APSK, QAM, CPM, ceCPM, or MACPM; and receive, from the second network node, second information indicative of at least one of the modulation scheme or the modulation parameter associated with the modulation scheme for at least one transmission.

Aspect 2 is the apparatus of aspect 1, where the first network node includes a UE or one or more components of the UE and the second network node includes a base station or one or more components of the base station.

Aspect 3 is the apparatus of any of aspects 1 and 2, where the at least one processor is further configured to: determine the modulation scheme or the modulation parameter based on at least one of: an operating point of the first network node, one or more capabilities of the first network node for different modulation schemes, or a non-linearity of the first network node.

Aspect 4 is the apparatus of any of aspects 1 to 3, where the at least one processor is further configured to: transmit a PHR associated with the first network node to the second network node, where the modulation scheme or the modulation parameter is based on the PHR.

Aspect 5 is the apparatus of any of aspects 1 to 4, where the modulation scheme or the modulation parameter is based on an MCS or a rank associated with the at least one transmission.

Aspect 6 is the apparatus of any of aspects 1 to 5, where the at least one processor is further configured to: transmit or receive the at least one transmission based on at least one of the modulation scheme or the modulation parameter.

Aspect 7 is the apparatus of any of aspects 1 to 6, where the modulation scheme is associated with the ceCPM scheme or the MACPM scheme.

Aspect 8 is the apparatus of any of aspects 1 to 7, where the modulation parameter is based on an envelope variation or a minimum transmission distance for the at least one transmission.

Aspect 9 is the apparatus of any of aspects 1 to 8, where the modulation scheme is the CPM, the ceCPM, or the MACPM, and the at least one processor is further configured to: apply at least one of the modulation scheme or the modulation parameter to the at least one transmission; and insert at least one CP or at least one GI to the at least one transmission without applying DFT to the at least one transmission.

Aspect 10 is the apparatus of any of aspects 1 to 9, where the at least one processor is further configured to: perform FDE for the at least one transmission.

Aspect 11 is the apparatus of any of aspects 1 to 10 further including at least one of a transceiver or an antenna coupled to the at least one processor.

Aspect 12 is a method of wireless communication for implementing any of aspects 1 to 11.

Aspect 13 is an apparatus for wireless communication including means for implementing any of aspects 1 to 11.

Aspect 14 is a non-transitory computer-readable medium storing computer executable code, where the code when executed by a processor causes the processor to implement any of aspects 1 to 11.

Aspect 15 is an apparatus for wireless communication including: a memory; and at least one processor coupled to the memory and the at least one processor is configured to: receive first information indicative of at least one of a modulation scheme or a modulation parameter from a second network node, where the modulation scheme is from a set of modulation schemes and the modulation parameter is associated with the modulation scheme, and where the set of modulation schemes includes one or more of: APSK, QAM, CPM, ceCPM, or MACPM; and transmit, to the second network node, second information indicative of at least one of the modulation scheme or the modulation parameter associated with the modulation scheme for at least one transmission.

Aspect 16 is the apparatus of aspect 15, where the second network node includes a UE or one or more components of the UE and the first network node includes a base station or one or more components of the base station.

Aspect 17 is the apparatus of any of aspects 15 and 16, where the at least one processor is further configured to: determine the modulation scheme or the modulation parameter associated with the modulation scheme based on the first information.

Aspect 18 is the apparatus of any of aspects 15 and 17, where the modulation scheme or the modulation parameter is based on at least one of: an operating point of the first network node, one or more capabilities of the first network node for different modulation schemes, or a PA non-linearity of the first network node.

Aspect 19 is the apparatus of any of aspects 15 and 18, where the at least one processor is further configured to: receive a PHR associated with the second network node from the second network node; and determine the modulation scheme or the modulation parameter based on the PHR.

Aspect 20 is the apparatus of any of aspects 15 and 19, where the at least one processor is further configured to: determine the modulation scheme or the modulation parameter based on an MCS or a rank associated with the at least one transmission.

Aspect 21 is the apparatus of any of aspects 15 and 20, where the at least one processor is further configured to: transmit or receive the at least one transmission based on at least one of the modulation scheme or the modulation parameter.

Aspect 22 is the apparatus of any of aspects 15 to 21, where the modulation scheme is associated with the ceCPM scheme or the MACPM scheme.

Aspect 23 is the apparatus of any of aspects 15 to 22, where the modulation parameter is based on an envelope variation or a minimum transmission distance for the at least one transmission.

Aspect 24 is the apparatus of any of aspects 15 to 23 further including at least one of a transceiver or an antenna coupled to the at least one processor.

Aspect 25 is a method of wireless communication for implementing any of aspects 15 to 24.

Aspect 26 is an apparatus for wireless communication including means for implementing any of aspects 15 to 24.

Aspect 27 is a non-transitory computer-readable medium storing computer executable code, where the code when executed by a processor causes the processor to implement any of aspects 15 to 24.

What is claimed is:

1. A first network node for wireless communication, comprising:
   a memory; and
   at least one processor coupled to the memory, wherein the at least one processor is configured to:
   transmit first information indicative of at least one of a modulation scheme or a modulation parameter to a second network node, wherein the modulation scheme is from a set of modulation schemes and the modulation parameter is associated with the modulation scheme, and wherein the set of modulation schemes includes one or more of: amplitude and phase-shift keying (APSK), quadrature amplitude modulation (QAM), continuous phase modulation (CPM), constrained envelope CPM (ceCPM), or multi-amplitude CPM (MACPM);
   receive, from the second network node, second information indicative of at least one of the modulation scheme or the modulation parameter associated with the modulation scheme for at least one transmission;
   apply at least one of the modulation scheme or the modulation parameter to the at least one transmission; and
   insert at least one cyclic prefix (CP) or at least one guard interval (GI) to the at least one transmission without applying discrete Fourier transform (DFT) to the at least one transmission.

2. The first network node of claim 1, wherein the first network node includes a user equipment (UE) or one or more components of the UE, and the second network node includes a base station or one or more components of the base station.

3. The first network node of claim 1, wherein the at least one processor is further configured to:
determine the modulation scheme or the modulation parameter based on at least one of: an operating point of the first network node, one or more capabilities of the first network node for different modulation schemes, or a power amplifier (PA) non-linearity of the first network node.

4. The first network node of claim 1, wherein the at least one processor is further configured to:
transmit a power headroom report (PHR) associated with the first network node to the second network node, wherein the modulation scheme or the modulation parameter is based on the PHR.

5. The first network node of claim 1, wherein the modulation scheme or the modulation parameter is based on a modulation and coding scheme (MCS) or a rank associated with the at least one transmission.

6. The first network node of claim 1, wherein the at least one processor is further configured to:
transmit or receive the at least one transmission based on at least one of the modulation scheme or the modulation parameter.

7. The first network node of claim 1, wherein the modulation scheme is associated with the ceCPM scheme or the MACPM scheme.

8. The first network node of claim 1, wherein the modulation parameter is based on an envelope variation or a minimum transmission distance for the at least one transmission.

9. The first network node of claim 1, wherein the modulation scheme is the CPM.

10. The first network node of claim 1, wherein the at least one processor is further configured to:
perform frequency domain equalization (FDE) for the at least one transmission.

11. The first network node of claim 1, wherein the modulation scheme is the ceCPM.

12. The first network node of claim 1, wherein the modulation scheme is the MACPM.

13. The first network node of claim 1, wherein, to insert at least one CP or at least one GI to the at least one transmission without applying DFT to the at least one transmission, the at least one processor is configured to insert the at least one CP to the at least one transmission.

14. The first network node of claim 13, wherein, to apply at least one of the modulation scheme or the modulation parameter to the at least one transmission, the at least one processor is configured to apply the modulation scheme to the at least one transmission.

15. The first network node of claim 13, wherein, to apply at least one of the modulation scheme or the modulation parameter to the at least one transmission, the at least one processor is configured to apply the modulation parameter to the at least one transmission.

16. The first network node of claim 1, wherein, to insert at least one CP or at least one GI to the at least one transmission without applying DFT to the at least one transmission, the at least one processor is configured to insert the at least one GI to the at least one transmission.

17. The first network node of claim 16, wherein, to apply at least one of the modulation scheme or the modulation parameter to the at least one transmission, the at least one processor is configured to apply the modulation scheme to the at least one transmission.

18. The first network node of claim 16, wherein, to apply at least one of the modulation scheme or the modulation parameter to the at least one transmission, the at least one processor is configured to apply the modulation parameter to the at least one transmission.

19. A first network node for wireless communication, comprising:
a memory; and
at least one processor coupled to the memory, wherein the at least one processor is configured to:
transmit first information indicative of a modulation scheme to a second network node, wherein the modulation scheme is from a set of modulation schemes including one or more of: amplitude and phase-shift keying (APSK), quadrature amplitude modulation (QAM), continuous phase modulation (CPM), constrained envelope CPM (ceCPM), or multi-amplitude CPM (MACPM);
receive, from the second network node, second information indicative of the modulation scheme for at least one transmission;
apply the modulation scheme to the at least one transmission; and
insert at least one cyclic prefix (CP) to the at least one transmission without applying discrete Fourier transform (DFT) to the at least one transmission.

20. The first network node of claim 19, wherein the modulation scheme is the CPM.

21. The first network node of claim 19, wherein the modulation scheme is the ceCPM.

22. The first network node of claim 19, wherein the modulation scheme is the MACPM.

23. The first network node of claim 19, wherein the modulation scheme is the CPM.

24. The first network node of claim 19, wherein the modulation scheme is the ceCPM.

25. The first network node of claim 19, wherein the modulation scheme is the MACPM.

26. A first network node for wireless communication, comprising:
a memory; and
at least one processor coupled to the memory, wherein the at least one processor is configured to:
transmit first information indicative of a modulation scheme to a second network node, wherein the modulation scheme is from a set of modulation schemes including one or more of: amplitude and phase-shift keying (APSK), quadrature amplitude modulation (QAM), continuous phase modulation (CPM), constrained envelope CPM (ceCPM), or multi-amplitude CPM (MACPM);
receive, from the second network node, second information indicative of the modulation scheme for at least one transmission;
apply the modulation scheme to the at least one transmission; and
insert at least one guard interval (GI) to the at least one transmission without applying discrete Fourier transform (DFT) to the at least one transmission.

27. The first network node of claim 26, wherein the modulation scheme is the CPM.

28. The first network node of claim 26, wherein the modulation scheme is the ceCPM.

29. The first network node of claim 26, wherein the modulation scheme is the MACPM.

30. A first network node for wireless communication, comprising:
- a memory; and
- at least one processor coupled to the memory, wherein the at least one processor is configured to:
  - transmit first information indicative of a modulation parameter to a second network node, wherein the modulation parameter is associated with a modulation scheme, wherein the modulation scheme is continuous phase modulation (CPM), constrained envelope CPM (ceCPM), or multi-amplitude CPM (MACPM);
  - receive, from the second network node, second information indicative of the modulation parameter for at least one transmission;
  - apply the modulation parameter to the at least one transmission; and
  - insert at least one cyclic prefix (CP) to the at least one transmission without applying discrete Fourier transform (DFT) to the at least one transmission.

31. A first network node for wireless communication, comprising:
- a memory; and
- at least one processor coupled to the memory, wherein the at least one processor is configured to:
  - transmit first information indicative of a modulation parameter to a second network node, wherein the modulation parameter is associated with a modulation scheme, wherein the modulation scheme is continuous phase modulation (CPM), constrained envelope CPM (ceCPM), or multi-amplitude CPM (MACPM);
  - receive, from the second network node, second information indicative of the modulation parameter for at least one transmission;
  - apply the modulation parameter to the at least one transmission; and
  - insert at least one guard interval (GI) to the at least one transmission without applying discrete Fourier transform (DFT) to the at least one transmission.

32. The first network node of claim 31, wherein the modulation scheme is the CPM.

33. The first network node of claim 31, wherein the modulation scheme is the ceCPM.

34. The first network node of claim 31, wherein the modulation scheme is the MACPM.

* * * * *